(12) United States Patent
Klitsner et al.

(10) Patent No.: US 6,322,449 B1
(45) Date of Patent: Nov. 27, 2001

(54) MECHANICAL INTERFACE DEVICE

(75) Inventors: Dan Klitsner, Larkspur; Jeff Argentine, Berkeley; Brian Clemens; Gary Levenberg, both of San Francisco, all of CA (US)

(73) Assignee: Klitsner Industrial Design, LLC, San Francisco, CA (US)

( * ) Notice: Subject to any disclaimer, the term of this patent is extended or adjusted under 35 U.S.C. 154(b) by 0 days.

(21) Appl. No.: 09/018,691

(22) Filed: Feb. 4, 1998

(51) Int. Cl.[7] ...................................................... G06F 17/00
(52) U.S. Cl. .............................. 463/37; 463/47; 345/156; 345/168; 273/241
(58) Field of Search .......................... 463/37, 47; 341/22; 345/168, 156, 169; 400/472; 273/241, 148 B

(56) References Cited

U.S. PATENT DOCUMENTS

| | | | |
|---|---|---|---|
| 3,317,019 | 5/1967 | Braune | 197/98 |
| 3,805,939 | 4/1974 | Ross | 197/19 |
| 3,825,101 | 7/1974 | Wineman . | |

(List continued on next page.)

FOREIGN PATENT DOCUMENTS

| | | | |
|---|---|---|---|
| 196 06 467 A1 | 8/1997 | (DE) | G06F/3/02 |
| 0 591 560 A1 | 4/1994 | (EP) . | |
| 0 810 543 A1 | 3/1997 | (EP) . | |
| WO 89/01356 | 2/1989 | (WO) . | |

OTHER PUBLICATIONS

Advertising Boruchure, "Piano Discovery", by Jump Software, Inc., 1997.
European Search Report, Jun. 15, 1999.
European Search Report, Jun. 18, 1999.
International Search Report, Jun. 2, 1999.

Primary Examiner—Kent Chang
(74) Attorney, Agent, or Firm—Fish & Richardson P.C.

(57) ABSTRACT

The present invention comprises both a system and a method for mechanically depressing a key of an underlying keyboard in response to a user input. The system preferably comprises a computer system and a mechanical interface device. The mechanical interface preferable mounts on top of the underlying keyboard and preferably includes a three dimensional representational object configured for manipulation by the user. This computer system preferably comprises a processor, a display coupled to the processor, and the underlying keyboard coupled to the processor. The computer system preferably shows a corresponding image in response to manipulation of the three dimensional representational object by the user. By utilizing the three dimensional representational object instead of a keyboard as the user's interface, the present invention gives the user a simpler, more realistic computer interface. Further, the present invention allows the existing computer system with the processor, display and keyboard to be conveniently and inexpensively customized for specific applications by placing the mechanical interface device over the existing keyboard and properly configuring the processor. These are various applications for the present invention which include in part: providing realistic and entertaining games for the user, teaching young children coordination and other skills, and training users for specific occupations.

33 Claims, 16 Drawing Sheets

U.S. PATENT DOCUMENTS

| | | |
|---|---|---|
| 3,964,594 | 6/1976 | Gabbrielli et al. .................. 197/98 |
| 4,012,127 | 3/1977 | Bolander .............................. 350/243 |
| 4,020,328 | 4/1977 | Bradam ................................ 235/146 |
| 4,030,094 | 6/1977 | Anderson ......................... 340/365 R |
| 4,075,465 | 2/1978 | Funk et al. ....................... 235/145 R |
| 4,100,402 | 7/1978 | Lundström et al. ............. 235/145 R |
| 4,124,313 | 11/1978 | Schmidt et al. ................... 400/491.2 |
| 4,158,430 | 6/1979 | Speraw et al. ....................... 235/146 |
| 4,199,839 | 4/1980 | Martinec .............................. 15/354 |
| 4,536,160 | 8/1985 | Hatfield ............................... 434/227 |
| 4,540,176 | 9/1985 | Baer . |
| 4,575,591 | 3/1986 | Lugaresi ............................. 200/6 A |
| 4,595,804 | 6/1986 | MacConnell ........................ 200/5 A |
| 4,729,563 | 3/1988 | Yokoi . |
| 4,786,768 | 11/1988 | Langewis et al. .................. 200/6 A |
| 4,825,019 | 4/1989 | Fisher .................................. 200/6 A |
| 4,945,357 | 7/1990 | Tal ........................................ 341/20 |
| 5,034,574 | 7/1991 | Martovitz ............................ 200/6 A |
| 5,089,690 | 2/1992 | Okamura ......................... 235/145 R |
| 5,092,459 | 3/1992 | Uljanic et al. ....................... 206/320 |
| 5,096,317 | 3/1992 | Phillipe .............................. 400/714 |
| 5,193,924 | 3/1993 | Larson . |
| 5,204,511 | 4/1993 | Baitz et al. . |
| 5,214,429 | 5/1993 | Greenberg ............................. 341/22 |
| 5,260,869 | 11/1993 | Ferrier et al. . |
| 5,296,845 | 3/1994 | Haller . |
| 5,343,219 | 8/1994 | DuBosque, Jr. .................... 345/160 |
| 5,413,294 | 5/1995 | Greequist . |
| 5,420,607 | 5/1995 | Miller et al. . |
| 5,452,960 | 9/1995 | Kuhlenschmidt ................... 400/487 |
| 5,514,855 | 5/1996 | Sullivan .......................... 235/145 R |
| 5,556,339 | 9/1996 | Cohen . |
| 5,583,496 | 12/1996 | Sharpe, III et al. ................... 341/22 |
| 5,600,313 | 2/1997 | Freedman .............................. 341/22 |
| 5,603,658 | 2/1997 | Cohen .................................... 463/1 |
| 5,647,796 | 7/1997 | Cohen .................................... 463/1 |
| 5,667,319 * | 9/1997 | Satloff ................................... 341/22 |
| 5,677,319 | 10/1997 | Satloff ................................ 400/472 |
| 5,717,423 | 2/1998 | Parker . |
| 5,746,604 | 5/1998 | Cohen . |
| 5,751,273 | 5/1998 | Cohen . |
| 5,781,406 | 7/1998 | Hunte . |
| 5,805,138 | 9/1998 | Brawne et al. . |
| 5,818,420 | 10/1998 | Mitsumine et al. . |
| 5,967,898 * | 10/1999 | Takasaka et al. ...................... 463/37 |
| 5,976,018 | 11/1999 | Druckman . |
| 5,992,817 | 11/1999 | Klitsner et al. . |

* cited by examiner

MECHANICAL INTERFACE DEVICE

RELATED APPLICATION

This application is with U.S. application Ser. No. 09/019,489, now U.S. Pat. No. 5,992,817, which was filed Feb. 4, 1998, is titled "KEYBOARD INTERFACE DEVICE," and is incorporated by reference.

FIELD OF THE INVENTION

The present invention relates to the field of mechanical interface devices for use with an underlying keyboard. More particularly, this invention relates to mechanical interface devices that include a three dimensional representational object configured for manipulation by a user.

BACKGROUND OF THE INVENTION

The use of computer keyboards is well known in the art. Typically, standard computer keyboards are electrically connected to a personal computer and utilized as an input device to efficiently enter data. For those people that possess the requisite dexterity and are skilled in typing, standard computer keyboards are well suited for quickly inputting text. However, the standard computer keyboard is not well suited for young children with limited dexterity or those not skilled at typing.

Today with the growth of more powerful and less expensive computers, there is an increase in graphically based applications. There are more software applications that interactively display virtual objects which represent real objects that are controlled by the user for both education and entertainment.

For example, a software application is capable of displaying a virtual warehouse environment which includes a virtual forklift. This particular software application preferably allows the user to control this virtual forklift like a real forklift. Further, the virtual forklift interacts with other objects in the virtual warehouse environment similar to the real forklift interacting with real objects in a real warehouse. By practicing on the virtual forklift, a user with no knowledge of forklifts is able to learn how to operate a real forklift without the expense and danger of practicing on a real forklift. Further, at the same time, this software also entertains the user by showing the realistic interactions between the virtual forklift and objects within the virtual warehouse environment.

Unfortunately, in many interactive applications, like the virtual forklift example above, the standard computer keyboard fails to provide the user with a realistic interface with the interactive software application. In particular, to the user, the standard keyboard does not appear as a virtual control to operate the virtual forklift. As a result, the standard keyboard does not act as a representational object in these interactive applications. Instead, this standard keyboard appears as simply an ordinary computer keyboard.

As an alternative to the standard keyboard, the use of peripheral input devices such as a joystick, mouse, and trackball which electrically couple to a personal computer are also well known in the art. Although these peripheral input devices offer alternatives to the standard computer keyboard, these peripheral devices are costly to purchase and maintain because of their inherent electronic complexity. Further, the joystick, mouse, and trackball are not realistic representational objects in interactive applications. Similar to the standard keyboard, these peripheral devices fail to provide the user with a realistic interface with interactive software applications. In reference to the forklift example described above, to the user, these peripheral devices do not appear as virtual controls to operate the virtual forklift. Instead, these peripheral devices appear as the respective joystick, mouse, and trackball.

Mechanical joystick devices which mechanically couple to an underlying keyboard are also well known in the art. While these mechanical joystick devices are simpler than their electronic counterparts, these mechanical joystick devices fail to provide the user with a realistic interface with interactive software applications. Similar to the electronically coupled joystick, the mechanical joystick device fails to appear as a representational object of the virtual object displayed by the software application. Instead, the mechanical joystick device appears an ordinary joystick.

U.S. Pat. No. 5,667,319 issued to Satloff on Sep. 16, 1997, teaches a mechanical keyboard interface device with enlarged, decorative buttons. Each enlarged, decorative button has a flat top surface. Additionally, each button has two dimensional pictures of objects on top of the flat top surface. However, this interface device, as taught in the Satloff reference, fails to provide the user with a realistic, three dimensional representational interface to interact with software applications. These buttons taught by the Satloff reference have merely a two dimensional surface. For example, a two dimensional picture showing a face of a cat over one of the buttons is shown in the Satloff reference. Accordingly, this particular button showing the face of the cat is not a three dimensional representation of a virtual cat.

What is needed is a mechanical interface device for use with an underlying keyboard. Further, what is needed is an interface device that utilizes a three dimensional representational object that is manipulated by a user.

SUMMARY OF THE INVENTION

The present invention comprises both a system and a method for mechanically depressing a key of an underlying keyboard in response to a user input. The system preferably comprises a computer system and a mechanical interface device. The mechanical interface preferably mounts on top of the underlying keyboard and preferably includes a three dimensional representational object configured for manipulation by the user. This computer system preferably comprises a processor with a sound output, a display coupled to the processor, and the underlying keyboard coupled to the processor. The computer system preferably shows a corresponding image in response to manipulation of the three dimensional object by the user.

Preferably, the mechanical interface device includes a depressing mechanism coupled to the three dimensional representational object. This mechanical interface device is positioned to mechanically articulate a key on the underlying keyboard. Each three dimensional object preferably corresponds to a single particular key of the underlying keyboard. Further, this depressing mechanism preferably receives an input from the three dimensional object, and based upon this input, the depressing mechanism either depresses or releases this particular key of the underlying keyboard. In use, the mechanical interface device selectively depresses and releases a particular key of the underlying keyboard in response to the user manipulating the three dimensional object.

The processor preferably receives input from the underlying keyboard which is coupled to the mechanical interface device. Based upon this input from the underlying keyboard which preferably originates from the user manipulating the three dimensional representational object, the processor preferably generates a corresponding sound output and a corresponding image which is shown on the display. This corresponding sound output and image which is generated by the processor directly relates to the user's manipulation of the three dimensional representational object.

By utilizing the three representational dimensional object instead of a keyboard as the user's interface, the present invention gives the user a simpler, more realistic computer interface. Further, the present invention allows the existing computer system with the processor, display, and underlying keyboard to be conveniently and inexpensively customized for specific applications by placing the mechanical interface device over the existing keyboard and properly configuring the processor. There are various applications for the present invention which include in part: providing realistic and entertaining games for the user, teaching young children coordination and related skills, and training users for specific occupations.

It is an object of the present invention to provide a user with a mechanical interface device that fits over an existing keyboard wherein the user manipulates a three dimensional representational object to activate a particular key on the underlying keyboard instead of directly depressing this particular key. It is another object of the present invention to generate a corresponding sound input and show a corresponding image on the display in response to the user manipulating the three dimensional representational object.

DETAILED DESCRIPTION OF THE INVENTION

The present invention comprises both a system for and a method of mechanically depressing a key of an underlying keyboard in response to a user. The system preferably comprises a computer system and a mechanical interface device which mounts over an underlying keyboard. The present invention mechanically interfaces with the underlying keyboard. By utilizing this mechanical interface, the present invention is configured to function with a variety of existing keyboards. Further, since the present invention utilizes no electronic components, the present invention is also preferably inexpensive to produce.

Figure 1A:
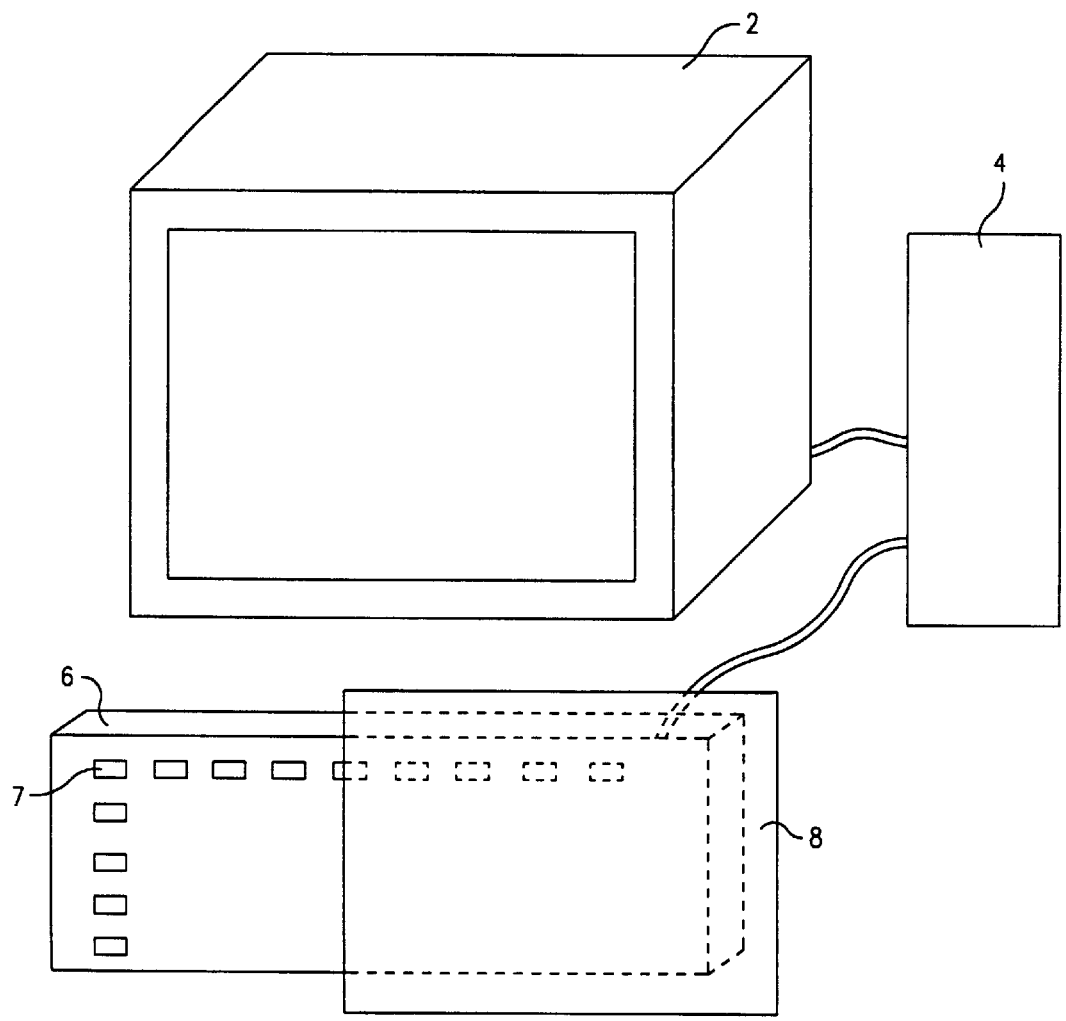
FIG. 1A illustrates a block diagram of the present invention.

FIG. 1A illustrates a diagram showing the components of the present invention. The computer system comprises a processor 4, a display 2, and an underlying keyboard 6. The display 2 is coupled to the processor 4 and is configured to receive an image from the processor 4. The display 2 shows this image utilizing conventional display techniques. The underlying keyboard 6 is also coupled to the processor 4. However, the keyboard 6 provides the processor 4 with an input signal. As is known, this input signal depends on whether a particular key 7 of the keyboard 6 is depressed. The processor 4 preferably generates the image which is sent to and shown on the display 2. Further, the processor 4 preferably generates this image in response to the input signal received from the underlying keyboard 6.

Preferably, a mechanical interface device 8 attaches over the underlying keyboard 6. This interface device 8 includes a depressing mechanism coupled to a three dimensional representational object. Preferably, the three dimensional representational object represents a real object and is configured to be manipulated by the user. For example, the three dimensional representational object that is part of the interface device 8 may be a toy saw which appears and is manipulated like a real saw. Detailed examples of three dimensional representational objects that are utilized with the interface device 8 are described in the embodiments which follow below.

In use, this mechanical interface device 8 is preferably coupled to the underlying keyboard 6. A particular three dimensional representational object preferably corresponds to a particular key of the underlying keyboard 6. For example, when this particular three dimensional representational object is appropriately manipulated by the user, the interface device 8 is configured such that the depressing mechanism depresses this particular key of the underlying keyboard 6. In other words, this depressing mechanism preferably receives an input from the three dimensional representational object, and based upon this input, the depressing mechanism either depresses or releases this particular key of the underlying keyboard 6. In use, the mechanical interface device 8 selectively depresses and releases a particular key of the underlying keyboard 6 in response to the user manipulating the three dimensional representational object.

The processor 4 preferably receives an input from the underlying keyboard 6 which is coupled to the mechanical interface device 8. Based upon this input, which preferably originates from the user manipulating the three dimensional representational object, the processor 4 preferably generates a corresponding sound output and a corresponding image which is shown on the display 2. Preferably, this corresponding sound output and image directly relates to the user's manipulation of the three dimensional representational object which is coupled to the mechanical interface device.

Figure 1B:
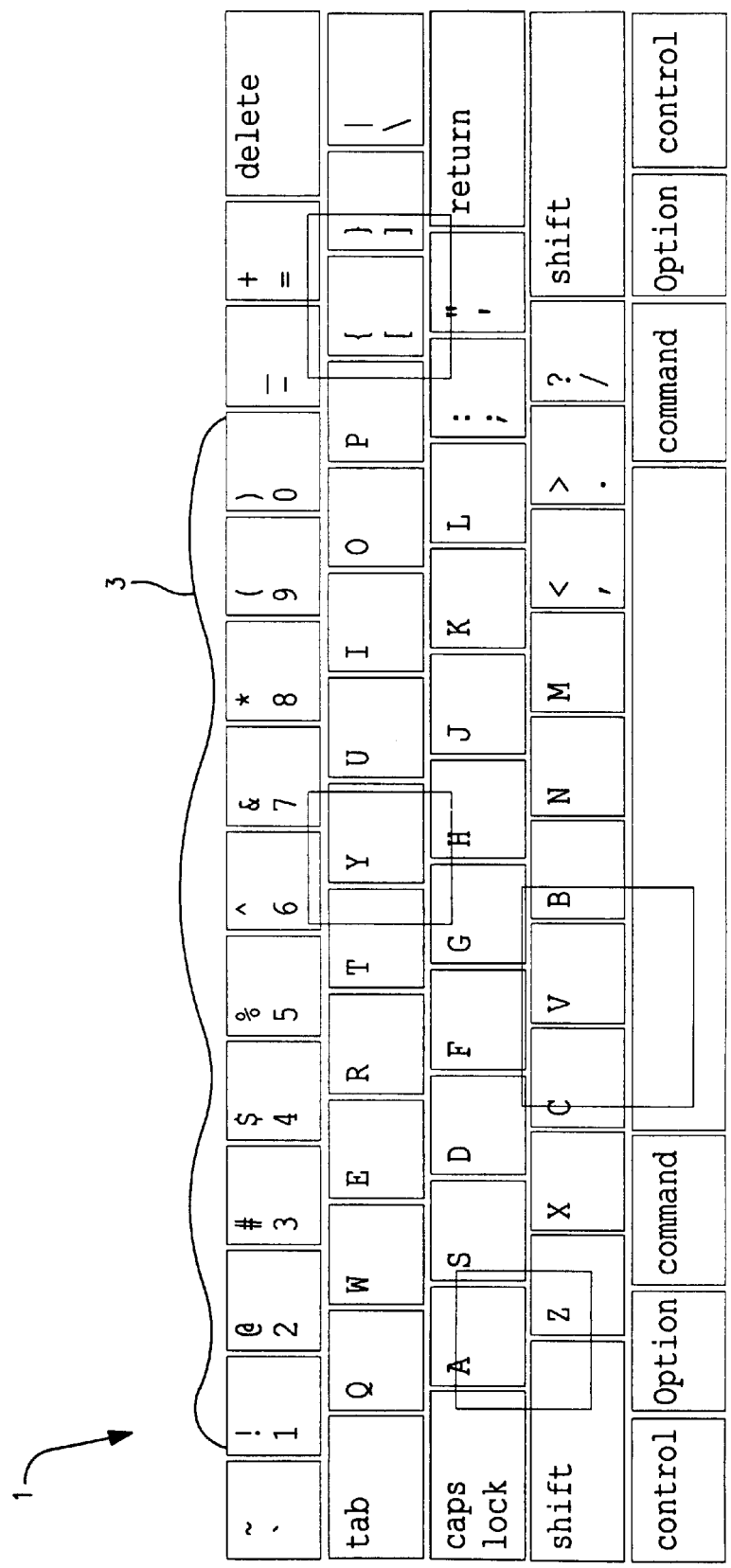
FIG. 1B illustrates an example of a QRTY keyboard.

FIG. 1B illustrates a sample QRTY keyboard 1. The keyboard 1 is preferably configured such that a plurality of number keys 3 is placed towards the top edge of the keyboard 1. This QRTY keyboard 1 is shown only for exemplary purposes and is not intended to limit the scope of the present invention.

The following embodiments described below and shown in FIGS. 2–13 each illustrate details of the present invention as interactive toys for young children. However, these embodiments are only exemplary and should not limit the scope of the present invention. For instance, the present invention may also be configured to be utilized as a training tool for various occupations such as heavy equipment operators, surgeons, dentists, and pilots.

Figure 2:
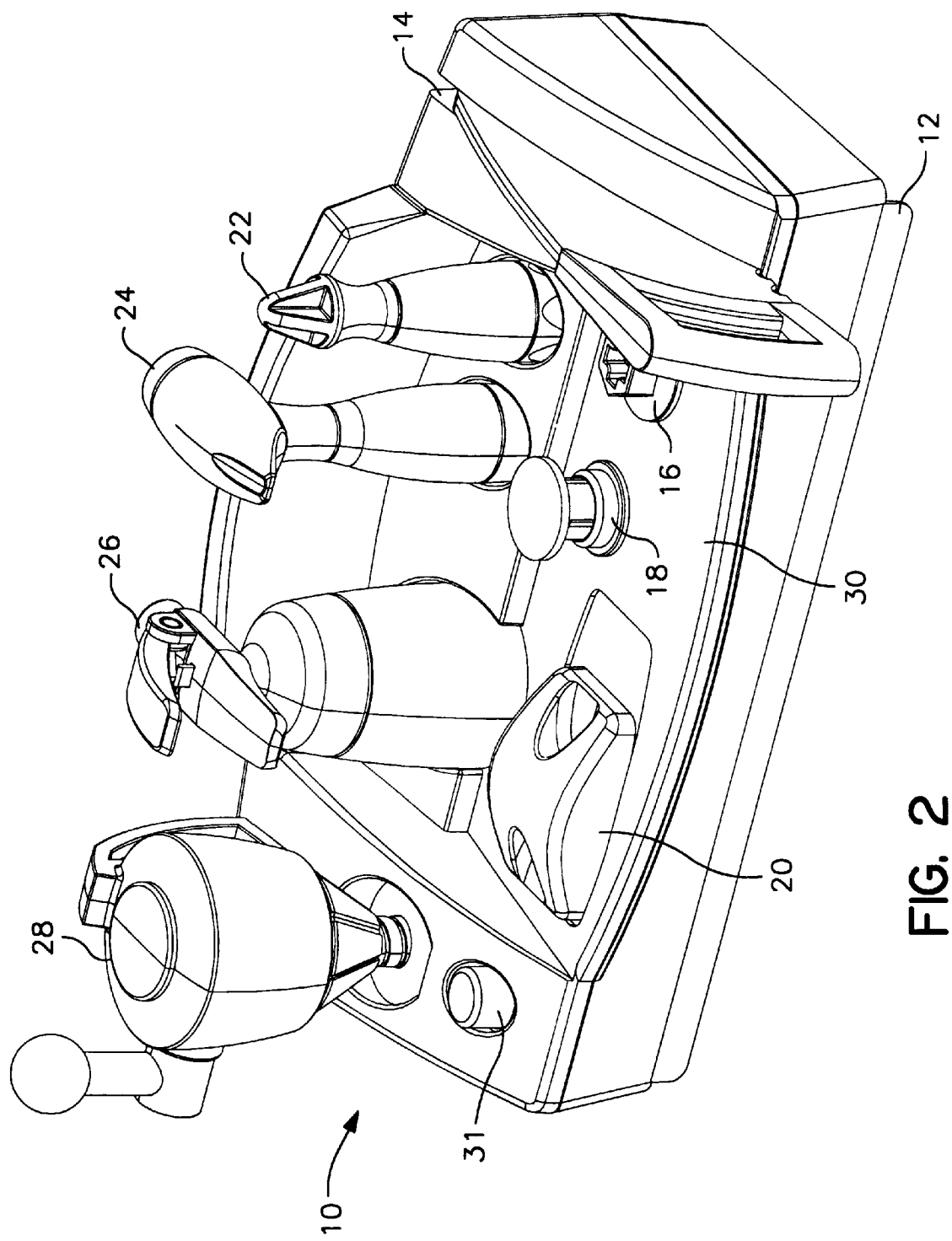
FIG. 2 illustrates a left perspective view of the preferred embodiment.

FIG. 2 illustrates a toy workshop device 10 which comprises the preferred embodiment of the present invention. The toy workshop 10 has an external housing 30 and a base 12. Preferably, the toy workshop device 10 is configured to fit on top of an underlying keyboard such as the keyboard 6 as shown in FIG. 1. More particularly, the base 12 preferably engages the underlying keyboard such that the toy workshop 10 and the underlying keyboard are coupled together.

As can be seen in FIG. 2, the toy workshop 10 houses a variety of three dimensional representational objects which comprise a saw 14, screw 16, nail 18, sander 20, screwdriver 22, hammer 24, sprayer 26, and drill 28. The saw 14, screw 16, nail 18, sander 20, sprayer 26, and drill 28 are coupled to the toy workshop 10. In contrast, the screwdriver 22 and the hammer 24 are preferably removably held in the toy workshop 10. Further, a button 31 preferably forms a portion of the external housing 30. The user preferably depresses the button 31 when assistance is needed.

Figure 3:
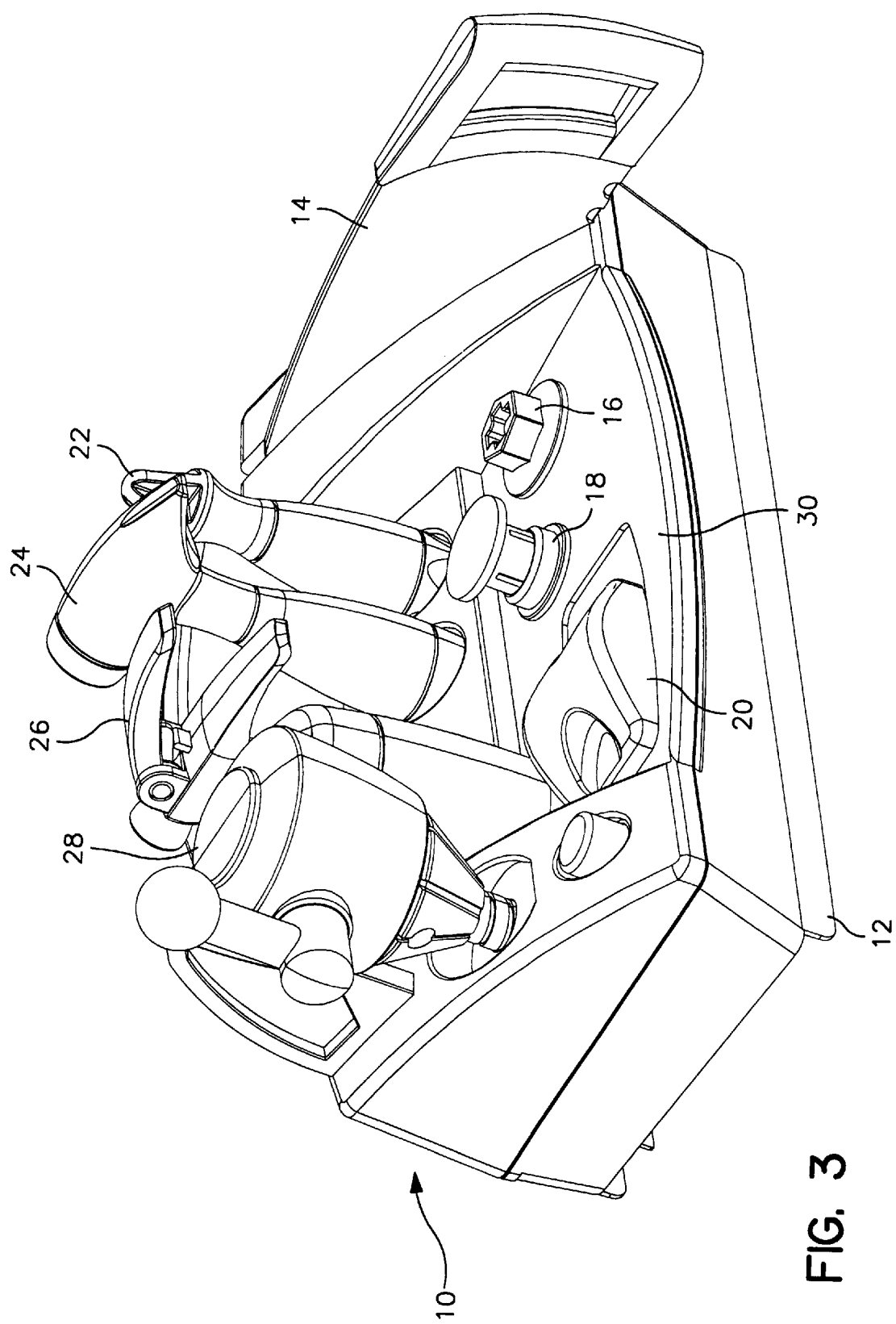
FIG. 3 illustrates a right perspective view of the preferred embodiment.

Preferably, the screw 16, nail 18, sander 20, screwdriver 22, hammer 24, sprayer 26, and drill 28 are three dimensional representational toy objects that appear realistic to the user. The screwdriver 22 and the hammer 24 preferably function in a similar manner as a real screwdriver and hammer would function. Further, the screwdriver 22 and the hammer 24 are preferably designed to interact with the screw 16 and the nail 18, respectively. Similar to FIG. 2, FIG. 3 illustrates a right perspective view of the preferred embodiment.

Figure 4:
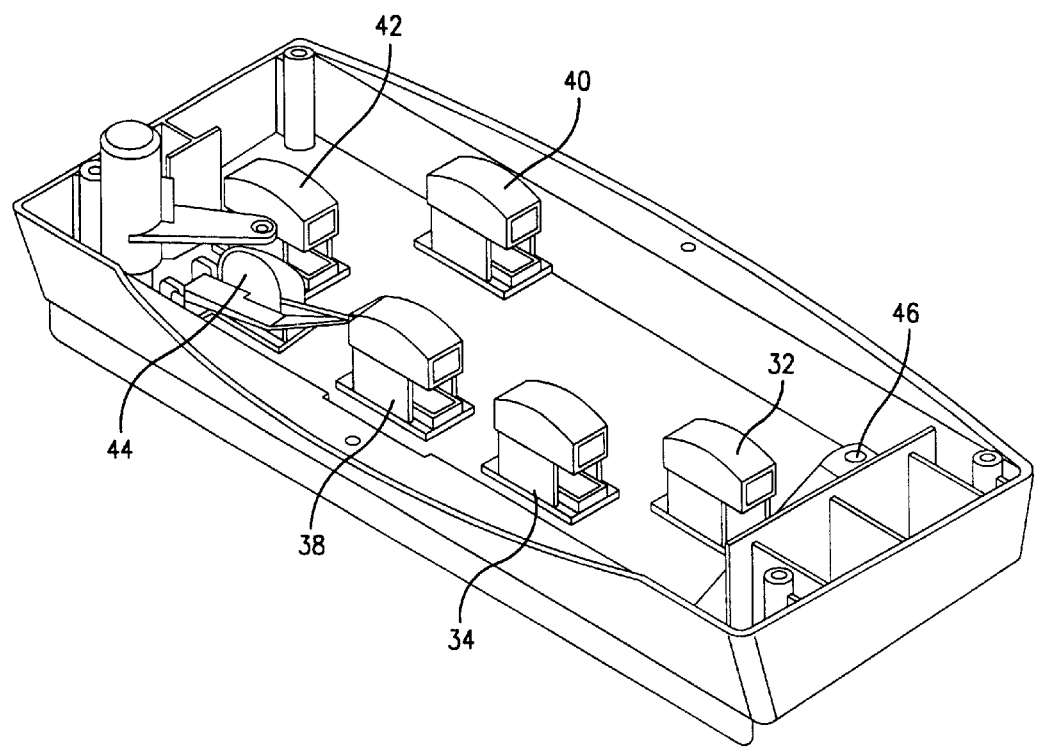
FIG. 4 illustrates a cutaway view the base of the preferred embodiment.

FIG. 4 illustrates a cutaway view of the base 12 of the toy workshop 10 such that internal components of the base 12 are revealed. Preferably, each representational object (ie.

saw 14, screw 16, nail 18, sander 20, screwdriver 22, hammer 24, sprayer 26, and drill 28) has an underlying corresponding depressing mechanism and is also coupled to this corresponding depressing mechanism. For example, a depressing mechanism 32 corresponds to the screw 16, a depressing mechanism 36 corresponds to the nail 18, a depressing mechanism 38 corresponds to the sander 20, a depressing mechanism 40 corresponds to the sprayer 26, a depressing mechanism 42 corresponds to the drill 28, a depressing mechanism 44 corresponds to the button 31, and a depressing mechanism 46 corresponds to the saw 14. Preferably, each of these underlying depressing mechanisms is located below their respective objects and above the underlying keyboard 6. In other words, each depressing mechanism preferably acts as a connector between each representational object and the corresponding key of the underlying keyboard 6. Each spring preferably prevents the corresponding key from being depressed when the representational object is not manipulated appropriately. Conversely, when the representational object is appropriately manipulated, each corresponding depressing mechanism preferably depresses the corresponding, underlying key.

Figure 5A:
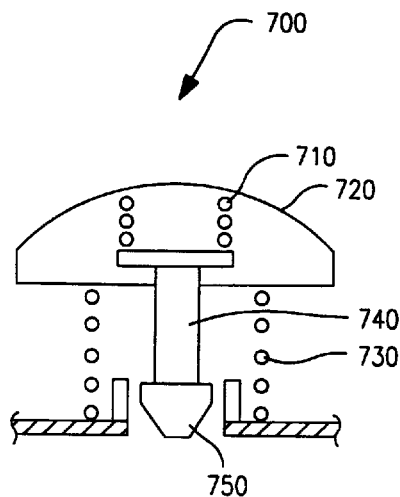
FIG. 5A illustrates a detailed schematic of the spring assembly as shown in FIG. 4.

FIG. 5A illustrates a detailed drawing of a spring assembly 700 that is preferably utilized as the depressing mechanisms 32, 34, 36, 38, 40, 42, and 44. The spring assembly 700 comprises a secondary spring 710, a contact 720, a primary spring 730, an actuator 740, and a PVC portion 750. The primary spring 730 and the secondary spring 710 is preferably a coil type of spring constructed of either metal or plastic. Preferably, the primary spring 730 has a lower spring constant k than the secondary spring 710. The PVC portion 750 forms a portion of the actuator 740 which depresses a particular key of the underlying keyboard 6.

In use, the contact 720 receives an outside force preferably from the user manipulating a particular representational object or depressing the button 31. When the outside force is less than a predetermined level to depress a corresponding underlying key, the primary spring 730 preferably prevents the corresponding key of the underlying keyboard 6 from being accidentally depressed by urging the PVC portion 750 away from the underlying keyboard 6. When the outside force is not sufficient to depress the corresponding underlying key, the secondary spring 710 is preferably not compressed.

When the outside force equals or exceeds this predetermined level to depress the corresponding underlying key, the primary spring 730 preferably compresses and lowers the actuator 740. As a result, the PVC portion 750 depresses the corresponding key of the underlying keyboard 6. The PVC portion 750 is configured to securely grip the corresponding key of the underlying keyboard.

Additionally, the secondary spring 710 is preferably coupled between the contact 720 and the actuator 740. When the PVC portion 750 is depressing the underlying key, the secondary spring 710 preferably prevents the PVC portion 750 from transferring too much of the outside force to the underlying key and possibly damaging this underlying key. Preferably, the secondary spring 710 absorbs this excess force directed to the underlying key from the PVC portion 750 when this corresponding key is already fully depressed. When the underlying key is already fully depressed and there is additional outside force, the secondary spring 710 preferably compresses to absorb this additional downward force thereby preventing the PVC portion 750 from exerting additional downward force on the fully depressed, underlying key.

Figure 5B:
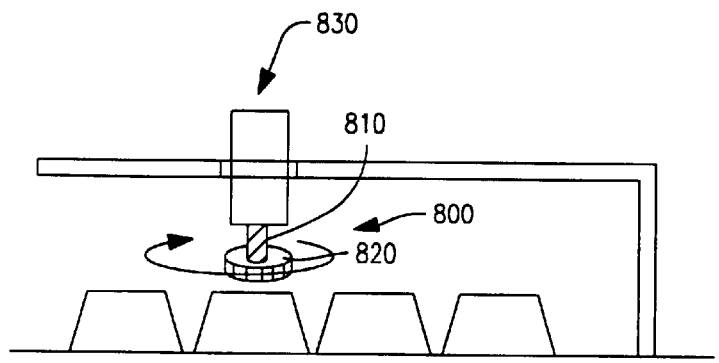
FIG. 5B illustrates a detailed drawing of an alternate actuator embodiment of the spring assembly shown in FIG. 5A.

FIG. 5B illustrates an alternate embodiment of the actuator described in FIG. 5A. An adjustable actuator 800 preferably includes a threaded portion 810 and a rotatable portion 820. The rotatable portion 820 is configured to engage the threaded portion 810. A contact 830 receives the outside force and transfers the force to the adjustable actuator 800. The rotatable portion 820 preferably depresses the corresponding key of the underlying keyboard 6. The adjustable actuator 800 is configured to allow the user to adjust the distance between the rotatable portion 820 and the corresponding underlying key. The rotatable portion 820 is configured to adjust the distance between the adjustable actuator 800 and the underlying keyboard 6 by rotating the rotatable portion clockwise and counter-clockwise with respect to the threaded portion 810, respectively. This allows the adjustable actuator 800 to fully depress an underlying key while preventing it from incurring any damage hereto.

Figure 5C:
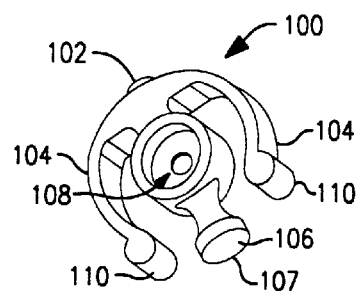
FIG. 5C illustrates a detailed schematic of a first alternate spring embodiment of the spring assembly shown in FIG. 5A.

FIG. 5C illustrates a detailed drawing of a first alternate spring assembly 100 that are configured to be utilized as the depressing mechanisms 32, 34, 36, 38, 40, 42, and 44. The spring assembly 100 comprises a spring 104, an actuator 106, a contact 102, a protective cushion 108, and a pair of feet 110 which form the lower part of the spring 104. Preferably, the spring assembly 100 is made of a flexible, resilient material such as silicon rubber.

In use, the contact 102 preferably receives an outside force preferably from the user manipulating a particular representational object or depressing the button 31. Preferably, the contact 102 directs this outside force to the spring 104. When the outside force is less than a predetermined level to depress a corresponding underlying key, the spring 104 preferably prevents the corresponding key of the underlying keyboard 6 from being accidentally depressed by urging the actuator 106 away from the underlying keyboard 6. When the outside force equals or exceeds this predetermined level to depress the corresponding underlying key, the spring 104 preferably compresses and lowers the actuator 106 to depress the corresponding underlying key. In either case whether the outside force is less than or greater than the predetermined level to depress the underlying key, the pair of feet 110 are preferably in contact with the toy workshop 10 and preferably withstand the outside force exerted on the spring 104.

Further, when the actuator 106 makes contact with the corresponding underlying key, the actuator preferably grips this underlying key to prevent the actuator 106 from slipping away from the underlying key. Preferably, this actuator 106 has a bottom surface 107 that presses against the underlying key when the actuator 106 is depressing the same. The bottom surface 107 is preferably flat to maximize the ability of the actuator 106 to grip underlying keys which are contoured.

Additionally, the protective cushion 108 is preferably mounted between the contact 102 and the actuator 106. When the actuator is depressing the underlying key, the protective cushion 108 preferably prevents the actuator 106 from transferring too much of the outside force to the underlying key and possibly damaging this underlying key. Preferably, the protective cushion 108 absorbs this excess force directed to the underlying key from the contact 102. When the underlying key is already fully depressed and the contact 102 further compresses the spring 104 which pushes the actuator 106 further downward, the protective cushion 108 preferably deforms to absorb thing additional downward movement thereby preventing the actuator 106 from exerting additional downward force on the fully depressed, underlying key.

Figure 5F:
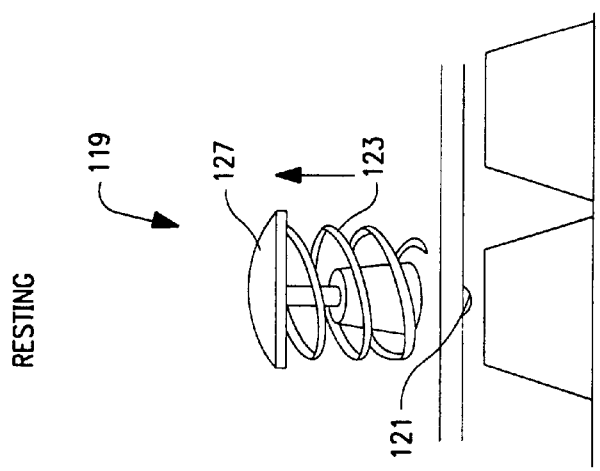
FIG. 5F illustrates the detailed schematic of the third alternate spring embodiment shown in FIG. 5C in a resting state.
Figure 5E:
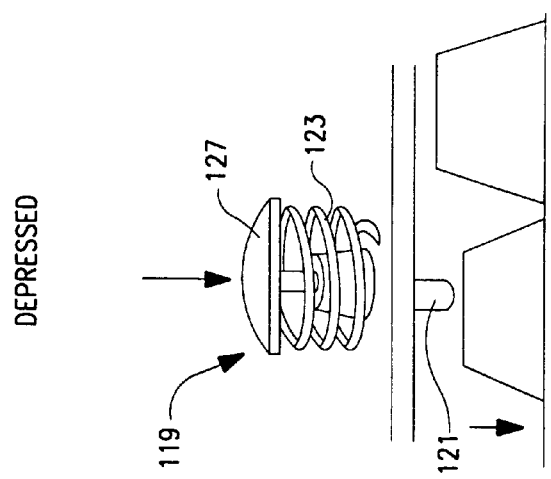
FIG. 5E illustrates a detailed schematic of a third alternate spring embodiment of the spring assembly shown in FIG. 5A in a depressed state.
Figure 5D:
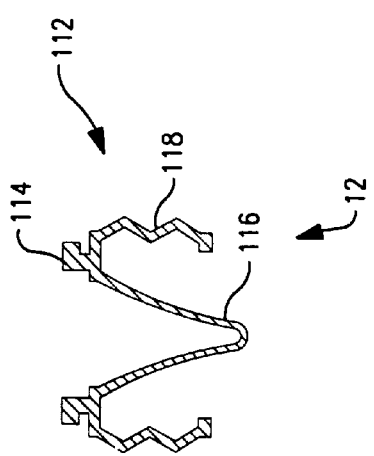
FIG. 5D illustrates a detailed schematic of a second alternate spring embodiment of the spring assembly shown in FIG. 5A.

FIG. 5D illustrates a second alternate spring assembly 112 in place of the preferred spring assembly 700 described above and shown in FIG. 5A. The spring assembly 112 comprises a spring 118, an actuator 116, and a contact 114. Preferably, the spring assembly 112 is made of a flexible, resilient material such as silicon rubber.

In use, the contact 114 preferably receives an outside force preferably from the user manipulating a particular representational object or depressing the button 31. Preferably, the contact 114 directs this outside force to the spring assembly 112. When the outside force is less than a predetermined level to depress a corresponding underlying key, the spring 118 preferably prevents the corresponding key of the underlying keyboard 6 from being accidentally depressed by urging the actuator 116 away from the underlying keyboard 6. When the outside force equals or exceeds this predetermined level to depress the corresponding underlying key, the spring 118 preferably compresses and lowers the actuator 116 to depress the corresponding underlying key.

Further, when the actuator 116 makes contact with the corresponding underlying key, the actuator preferably grips this underlying key to prevent the actuator 116 from slipping away from the underlying key. The actuator 116 is preferably sufficiently flexible such that the actuator 116 protects the prevents excessive force from reaching the underlying key thus protecting the underlying key from potential damage. Like the protective cushion 108, the actuator 116 preferably deforms to absorb this excess force to protect the underlying key.

FIGS 5E and 5F illustrate a third alternate spring assembly 119 in place of the preferred spring assembly 700 described above and shown in FIG. 5A. The spring assembly includes: a contact 127, a spring 123, and an actuator 121. Similar to the preferred spring assembly 100, the contact 127 receives an outside force preferably from the user manipulating a particular representational object or depressing the button 31. The spring 123 is a coil type of spring made from either plastic or metal and is coupled to the contact 127. Further, the actuator 121 is coupled to the contact 127 and is configured for selectively depressing a particular key of the underlying keyboard 6 depending on the outside force received by the contact 127.

FIG. 5E illustrates the spring assembly 119 in a depressed state. In this depressed state, there is sufficient force to depress the contact 127 which in turn, compresses the spring 123. As a result, the actuator 121 depresses the key of the underlying keyboard 6.

FIG. 5F illustrates the spring assembly 119 in a resting state. In this resting state, the outside force received by the contact 127 is not sufficient to compress the spring 123. As a result, the actuator 121 does not contact the particular key of the underlying keyboard 6.

Figure 6:
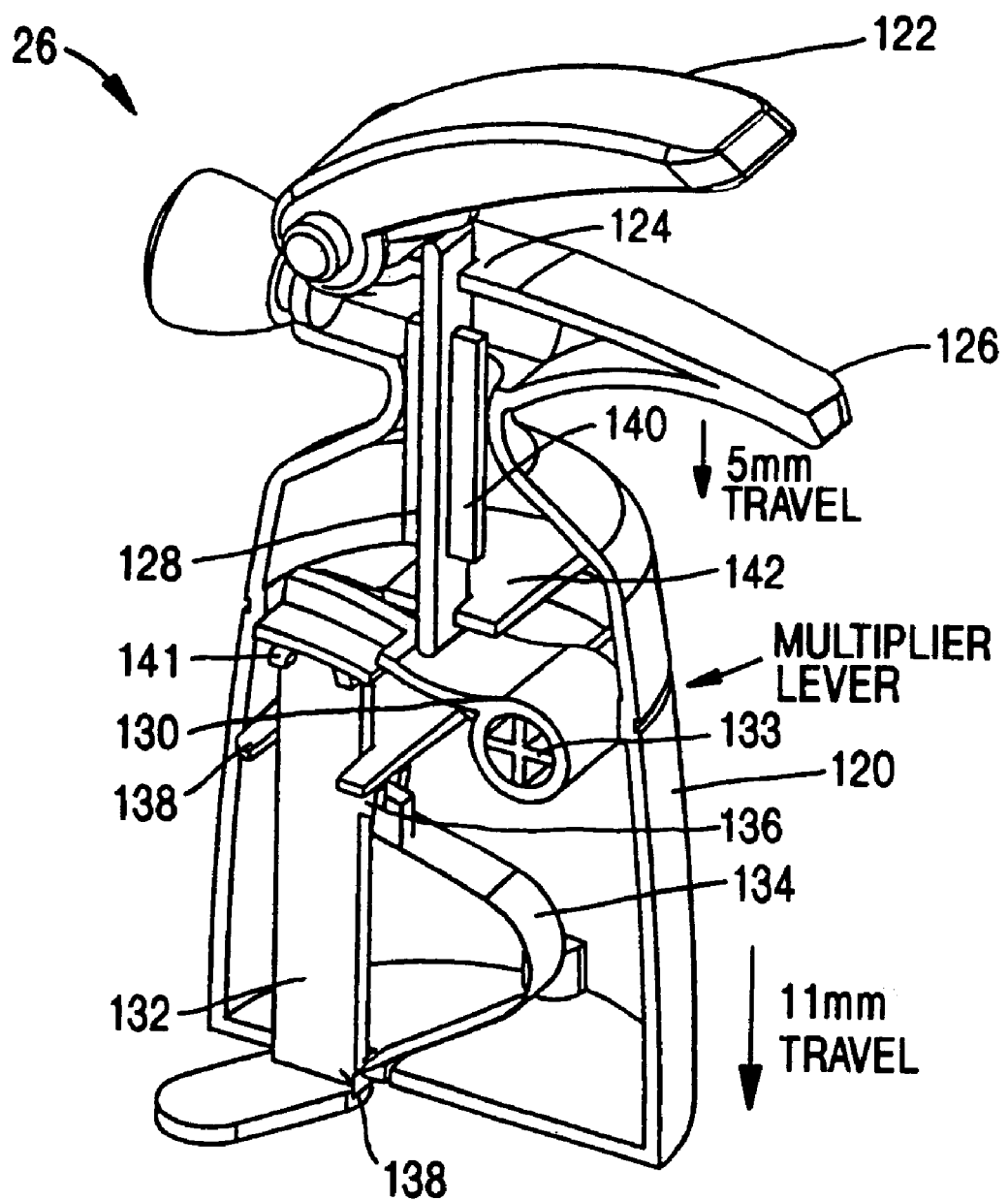
FIG. 6 illustrates a detailed cutaway view of the sprayer as shown in FIGS. 2 and 3 of the preferred embodiment.
Figure 7:
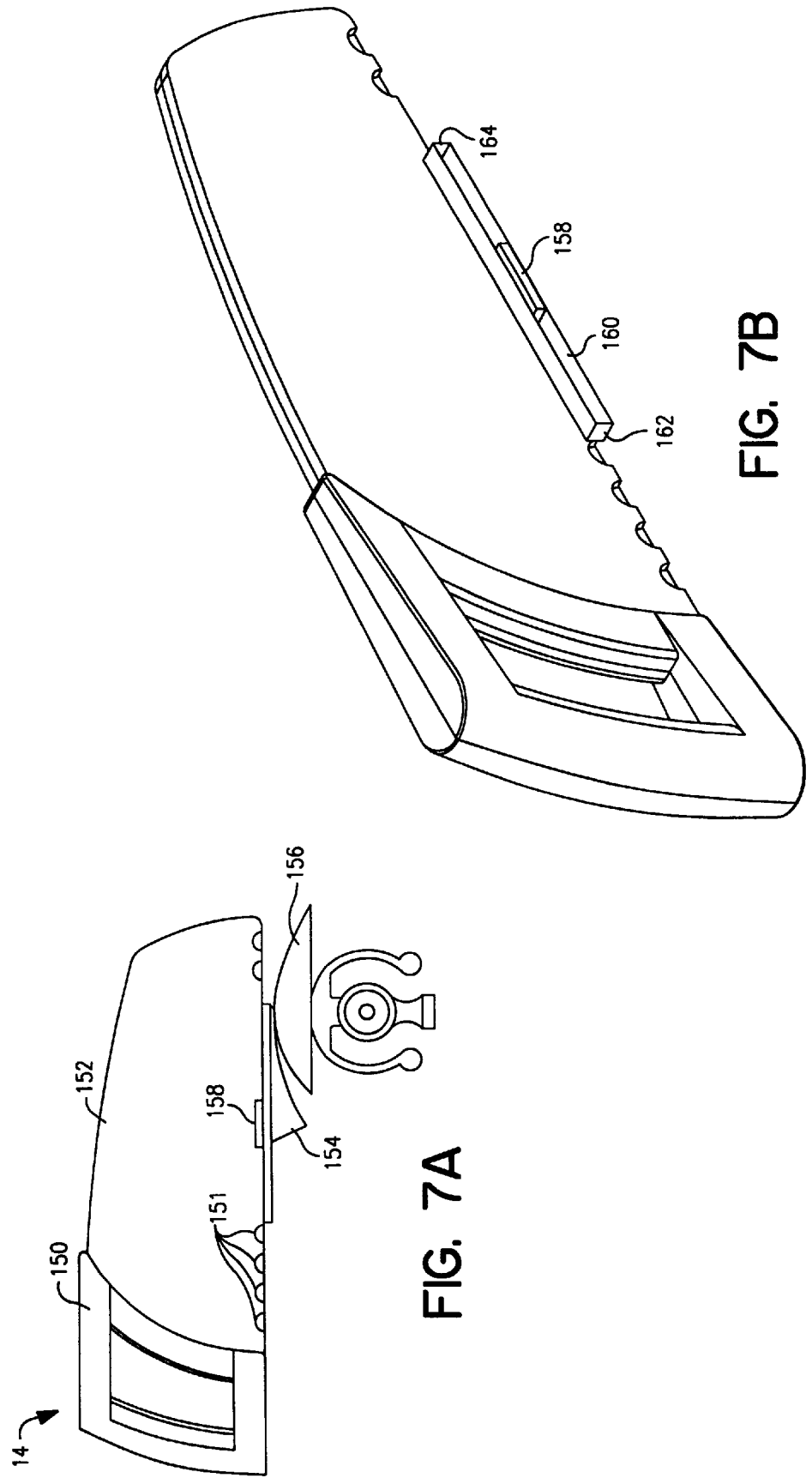
FIG. 7A illustrates a detailed side view of the saw as shown in FIGS. 2 and 3 of the preferred embodiment.
FIG. 7D illustrates a perspective view of the preferred saw as shown in FIGS. 2 and 3 of the preferred embodiment.
FIG. 7C illustrates a detailed side view of all alternate saw.

FIG. 6 illustrates a detailed cutaway diagram of the sprayer 26. A shell 120 preferably gives the appearance of a real sprayer and houses various internal parts of the sprayer 26. The shell 120 preferably houses a primary vertical connector 128, a pair of primary stoppers 140, a primary guide 142, a lever 130, a secondary vertical connector 132, a secondary stopper 136, a secondary guide 138, a limiter 141, and a spring 134. Further, a handle 126 preferably forms an integral part of the shell 120 wherein the handle 125 preferably has a slot 124 to receive the primary vertical connector 128. Preferably, a trigger 122 is hingedly attached to the shell 120 and configured such that the trigger 122 is aligned with the handle 126, and the trigger 122 contacts with the primary vertical connector 128. Further, the shell 120 also preferably has an aperture 138 for receiving the secondary vertical connector 132.

The pair of primary stoppers 140 are preferably attached to the primary vertical connector 128 such that the pair of primary stoppers 140 retain the primary vertical connector 128 engaged with the slot 124 and the primary guide 142. Preferably, the pair of primary stoppers 140 prevents the primary vertical connector 128 from rising above a first upper limit position by contacting the handle 126 and from going below a first lower limit by contacting the primary guide 142. Further, the secondary stopper 136 is preferably attached to the secondary vertical connector 132 such that the secondary stopper 136 retains the secondary vertical connector 132 engaged with the aperture 138. The secondary stopper 136 preferably contacts the secondary guide 138 when the secondary vertical connector 132 reaches a second upper limit. Finally, the limiter 141 is preferably attached to the lever 130 such that the limiter 141 retains the secondary vertical connector 132 when engaged with the secondary guide 138. Further, the limiter 141 preferably contacts the secondary guide 138 when the secondary vertical connector 132 reaches a second lower limit. The lever 130 is hingedly connected to the shell 120 at a position 133.

In use, to activate the sprayer 26, a user squeezes the trigger 122 towards the handle 126, thereby depressing the trigger 122. By depressing the trigger 122, the trigger 122 preferably depresses the primary vertical connector 128 downwards. Preferably, the primary guide 142 and the slot 124 through the handle 126 guides the primary vertical connector 128 in a vertical direction. As the primary vertical connector 128 moves in a downward direction, the primary vertical connector 128 preferably depresses the lever 130. As a result, the secondary guide 138 and the aperture 138 preferably guide the secondary vertical connector 132 as the lever 130 depresses the secondary vertical connector 132. As the secondary vertical connector 132 is depressed, the spring 134 is also preferably compressed. Finally, the particular key of the underlying keyboard 6 related to the sprayer 26 is preferably depressed by the downward moving secondary vertical connector 132. In sum, when the user appropriately manipulates the sprayer 26 by preferably squeezing the trigger 122, the particular key of the underlying keyboard 6 related to the sprayer 26 is depressed.

When no force is applied to the sprayer 26 by a user, the trigger 122 preferably contacts a first end of the primary vertical connector 128. Further, a second end of the primary vertical connector 128 preferably contacts the lever 130. Additionally, a first end of the secondary vertical connector 132 preferably contacts the lever 130. Preferably, the spring 134 urges a second end of the secondary vertical connector 132 away from an underlying key. However, even with the spring 134, the second end of the secondary vertical connector 132 may contact the underlying key in response to manipulation of the sprayer 26. It is important to note that although the spring 134 is part of the preferred embodiment, the spring 134 is not necessary for the sprayer 26 to properly operate. In addition to the spring 134, the depressing mechanism 40 also urges the second end of the secondary vertical connector 132 away from the underlying key.

The processor 4 preferably generates a corresponding, related sound and image of the sprayer 26 in response to whether the particular key of the underlying keyboard 6 related to the sprayer 26 is either depressed or upright. This corresponding, related and image of the sprayer 26 is preferably shown on the display 2. Further, the corresponding sound is generated by the processor 4.

Further, the lever 130 as shown in FIG. 6 is preferably configured to act as a multiplier. The user preferably manipulates the trigger 122 which moves the primary vertical connector 128. Because of the location of the primary vertical connector 128 and the secondary vertical connector 132 relative to the location 133 where the lever 130 is hingedly coupled to the shell 120, the lever 130 multiplies the movement of the primary vertical connector 128 and transfers this multiplied movement to the secondary vertical connector 132. In an alternate embodiment, the lever 130 may be configured to act as a reducer. For the lever 130 to act as a reducer, the secondary vertical connector 132 would preferably be located between the primary vertical connector 128 and the location 133 where the lever 130 is hingedly coupled to the shell 120.

FIG. 7A illustrates a side view of the saw 14 of the preferred embodiment. A handle portion 150 is preferably coupled to a blade portion 152 of the saw 14. The handle portion 150 allows a user to comfortably grasp the saw 14. The blade portion 152 preferably simulates the appearance of a real blade by utilizing a plurality of fake teeth 151 attached to the blade portion 152. Preferably, the plurality of fake teeth 151 are dull and pose no safety risks to the user. Preferably, an engagement tab 158 is attached to the blade portion 152. This engagement tab 158 couples the saw 14 to the base 12 and are preferably configured to allow the saw 14 to slidably move relative to the base 12.

Further, a curved actuator 154 is preferably attached to the blade portion 152. Preferably, a cap 156 is coupled to the base 12 and configured to engage the curved actuator 154. In use, the saw 14 preferably slides in two directions. As the saw 14 moves, the curved actuator 154 preferably contacts the cap 156 and also depressed the cap 156 in a vertical motion downward toward the base 12. The curved actuator 154 in conjunction with the cap 156 preferably translates the horizontal motion of the saw 14 relative to the base 12 into the vertical motion of the cap 156. It is important to note that in alternate embodiments, the slope of the curved actuator 154 and the corresponding cap 156 may be made flatter to provide a more gradual downward movement in relation to the horizontal motion of the saw 14. Conversely, the slope of the curved actuator 154 and the corresponding cap 156 may be made steeper to provide a quicker, more immediate downward movement in relation to the horizontal motion of the saw 14.

The cap 156 is preferably coupled to the depressing mechanism 46 such that the cap 156 provides the depressing mechanism 46 with a downward force when the cap 156 is depressed. Further, when the depressing mechanism 46 receives this downward force, the particular key of the underlying keyboard 6 related to the saw 14 is preferably depressed. The depressing mechanism 46 also preferably urges the cap 156 upwards to return to its original, upright position when the curved actuator 154 is not contacting the cap 156.

FIG. 7B illustrates a perspective view of the saw 14. The housing 12 preferably utilizes a track 160 to allow the saw 14 to slide in two directions in a controlled manner by guiding the blade portion 152 and by gripping the engagement tab 158. Further, two stoppers 162 and 164 are preferably coupled to the track 160 and limit the distance the saw 14 is able to travel. For example, the stopper 162 preferably contacts the engagement tab 158 when the handle portion 150 is farthest away from the track 160. On the other hand, the stopper 164 preferably contacts the engagement tab 158 when the handle portion 150 is closest to the track 160.

The processor 4 preferably generates a corresponding, related sound and image of the saw 14 in response to whether the particular key of the underlying keyboard 6 related to the saw 14 is either depressed or upright. This corresponding, related image of the saw 14 is preferably shown on the display 2. Further, the corresponding sound is generated by the processor 4.

FIG. 7C illustrates a side view of a saw 1000. The saw 1000 is an alternate embodiment of the saw 14 disclosed in FIGS. 7A and 7B. For the sake of clarity, common elements found in the saw 14 and the saw 1000 share common reference numbers. For example, the handle portion 150, the blade portion 152, the plurality of fake teeth 151, and the tab portion 158 are shared among the saw 1000 and the saw 14.

A semi-circle engagement portion 1010 is preferably coupled to the blade portion 152 of the saw 1000. A lever 1020 is hingedly coupled to the base 12 and configured to engage the semi-circle engagement portion 1010. In use, the saw 1000 preferably slides in two directions. As the saw 1000 moves, the semi-circle engagement portion 1010 preferably contacts the lever 1020 and also depressed the lever 1020 in a downward motion toward the base 12. The semi-circle engagement portion 1010 in conjunction with the lever 1020 preferably translates the horizontal motion of the saw 1000 relative to the base 12 into the downward motion of the lever 1020.

The lever 1020 is preferably coupled to the depressing mechanism 46 such that the lever 1020 provides the depressing mechanism 46 with a downward force when the lever 1020 is depressed. Further, when the depressing mechanism 46 receives this downward force, the particular key of the underlying keyboard 6 related to the saw 1000 is preferably depressed. The depressing mechanism 46 also preferably urges the lever 1020 upwards to return to its original, upright position when the semi-circle engagement portion 1010 is not depressing the lever 1020.

The sander 20 is preferably implemented in the same manner as described above for the saw 14 and the saw 1000.

Figure 8:
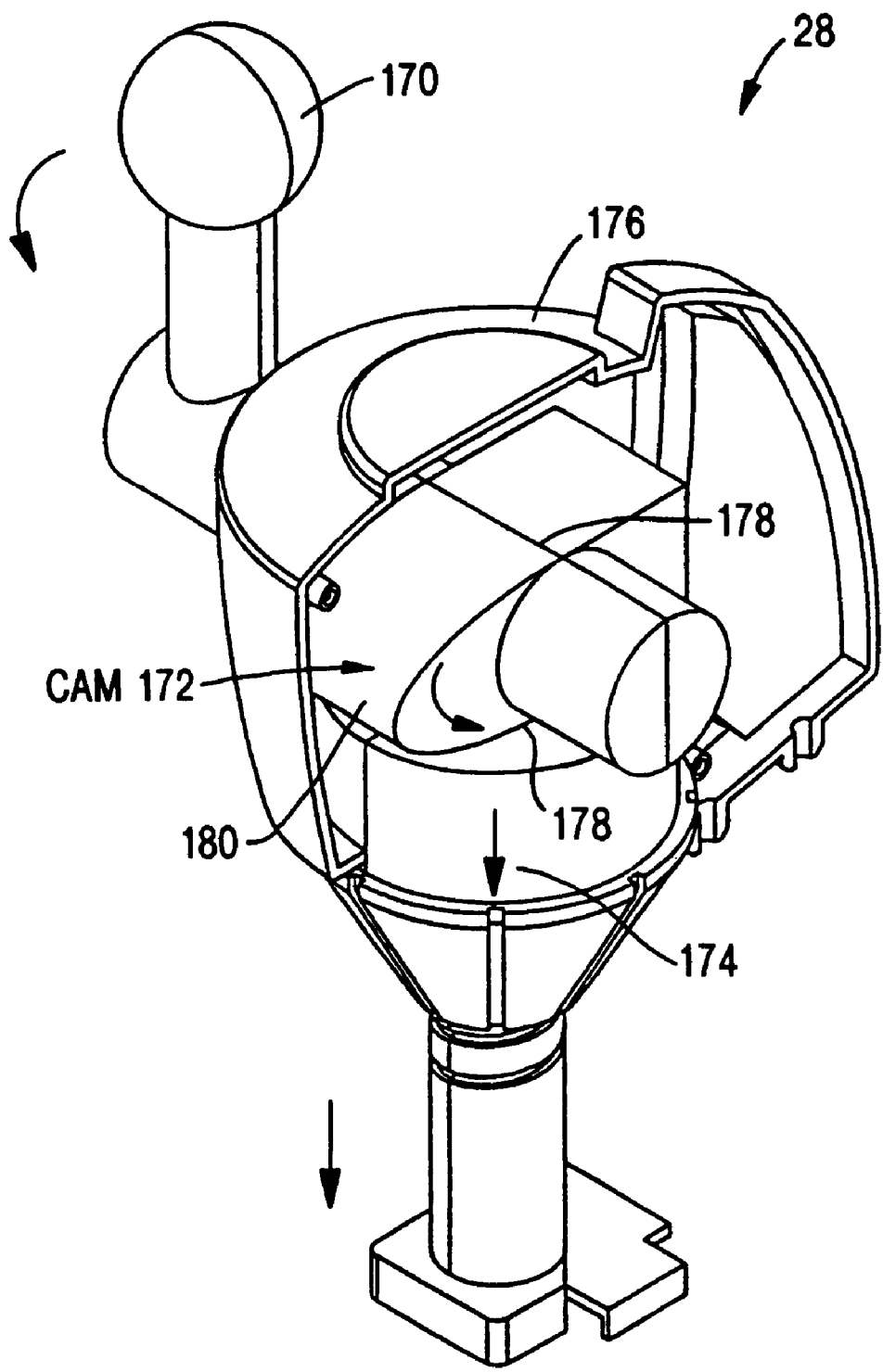
FIG. 8 illustrates a detailed cutaway view of the drill as shown in FIGS. 2 and 3 of the preferred embodiment.

FIG. 8 illustrates a detailed cutaway view of the drill 28. Preferably, the drill 28 has a drill housing 176 which is coupled to the base 12. Preferably, a handle 170 is rotatably coupled to the drill housing 176 such that the user may rotate a first end of the handle 170 relative to the drill housing 176. Preferably, a cam 172 is attached to a second end of the handle 170. Further, a first end of a vertical connector 174 preferably contacts the cam 172, and a second end of the vertical connector 174 preferably couples the depressing mechanism 42. The cam 172 contacts the vertical connector 174 at two different positions: an "on" position 180 and an "off" position 178. When the cam 172 contacts the vertical connector 174 at the "on" position 180, the vertical connector 174 preferably moves downward and depresses the depressing mechanism 42 such that the particular key of the underlying keyboard 6 related to the drill 28 is depressed. When the cam 172 contacts the vertical connector 174 at the "off" position 180, the vertical connector 174 preferably does not depress the depressing mechanism 42.

In use, when the cam 172 contacts the vertical connector 174 at the "off" position 178, the vertical connector 174 does not depress the depressing mechanism 42. As a result, the depressing mechanism 42 is also preferably not depressing the particular key related to the drill 28. Further, while in the "off" position 178, the depressing mechanism 42 preferably urges the vertical connector 174 towards the cam 172 and prevents the particular key related to the drill 28 from being depressed.

Preferably, when the first end of the handle 170 is turned by the user, the handle 170 rotates relative to the drill housing 176. As the handle 170 rotates, the cam 172 preferably rotates as well. When the handle 170 is rotated by the user such that the cam 172 contacts the vertical connector 174 at the "on" position 178, the vertical connector 174 preferably moves downward and depresses the depressing mechanism 42. When the depressing mechanism 42 is depressed, the actuator preferably depresses the particular key related to the drill 28.

The processor 4 preferably generates a corresponding, related sound and image of the drill 28 in response to whether the particular key of the underlying keyboard 6 related to the drill 28 is either depressed or upright. This corresponding, related image of the drill 28 is preferably shown on the display 2. Further, the corresponding sound is generated by the processor 4.

It is important to note that a transition between the "on" position 180 and the "off" position 178 of the cam 172 preferably varies with the configuration of the drill 28. In general, a quicker transition between the off position 178 and the on position 180 results in greater required user force to turn the handle 170 in order to activate the drill 28 and a shorter rotation of the handle 170 to change between the "off" position 178 and the "on" position 180. Conversely, a slower transition between the "off" position 178 and the "on" position 180 results in less force to turn the handle 170 to activate the drill 28, and a longer rotation of the handle 170 is needed to change between the "off" position 178 and the "on" position 180.

Figure 9A:
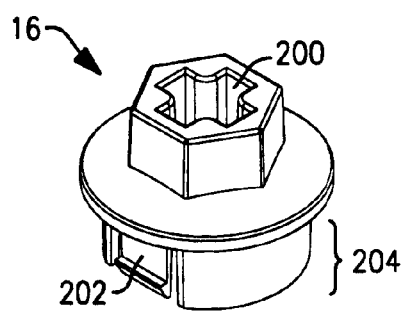
FIG. 9A illustrates a detailed perspective view of the screw as shown in FIGS. 2 and 3 of the preferred embodiment.

FIG. 9A shows a top perspective view of the screw 16. A screw head 200 preferably forms the visible portion of the screw above the housing 12. Preferably, the screw head 200 is configured such that the screwdriver 22 engages the screw head 200 and rotates the screw 16 relative to the base 12. However, it would be obvious to utilize another device equivalent to the screwdriver 12 or the user's hands to turn the screw 16. A pair of collars 204 preferably partially surrounds the screw 16 and preferably forms a portion of the screw 16 that contacts a cam housing 206 (shown in FIG. 9C.) Preferably, the pair of collars 204 is coupled the cam housing 206.

Figure 9B:
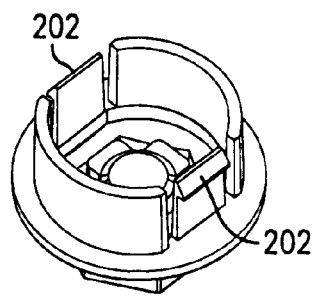
FIG. 9B illustrates a bottom view of the screw as shown in FIG. 9A.

FIG. 9B illustrates a bottom perspective view of the screw 16. A pair of engagement latches 202 wherein each engagement latch is located preferably between each of the pair of collars 204. Further, the pair of engagement latches 202 and the pair of collars 204 preferably lock onto the cam housing 206 such that the cam housing 206 rotates with the screw 16. Additionally, the pair of engagement latches 202 is preferably coupled to the base 12 such that the screw 16 is rotatably coupled to the base 12.

Figure 9C:
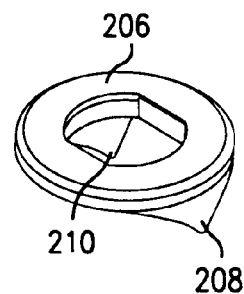
FIG. 9C illustrates the cam portion of the screw as shown in FIG. 9A.

FIG. 9C shows the cam housing 206. Preferably, the cam housing 206 includes two cams 208 and 210. Depending on the rotational position of the screw 16 relative to the base 12, these cams 208 and 210 preferably depress the depressing mechanism 34. In this preferred embodiment, the cam housing 206 comprises two cams 208 and 210. However, it would be obvious to utilize one cam or more than two cams on the cam housing 206.

In use, when the screw 16 is stationary, the coupled cams 208 and 210 may depress the depressing mechanism 34 depending on the rotational position of the cams 208 and 210. When the screw 16 is rotated relative to the base 12, the cams 208 and 210 preferably, in turn, depress the depressing mechanism 34. By depressing the depressing mechanism 34, the particular key of the underlying keyboard 6 related to the screw 16 is preferably depresses as well. The screw 16 preferably translates the rotational motion relative to the base 12 provided by the user into vertical motion as the cams 208 and 210 depress the depressing mechanism 34.

The processor 4 preferably generates a corresponding, related sound and image of the screw 16 in response to whether the particular key of the underlying keyboard 6 related to the screw 16 is either depressed or upright. This corresponding, related image of the screw 16 is preferably shown on the display 2. Further, the corresponding sound is generated by the processor 4.

Figure 10:
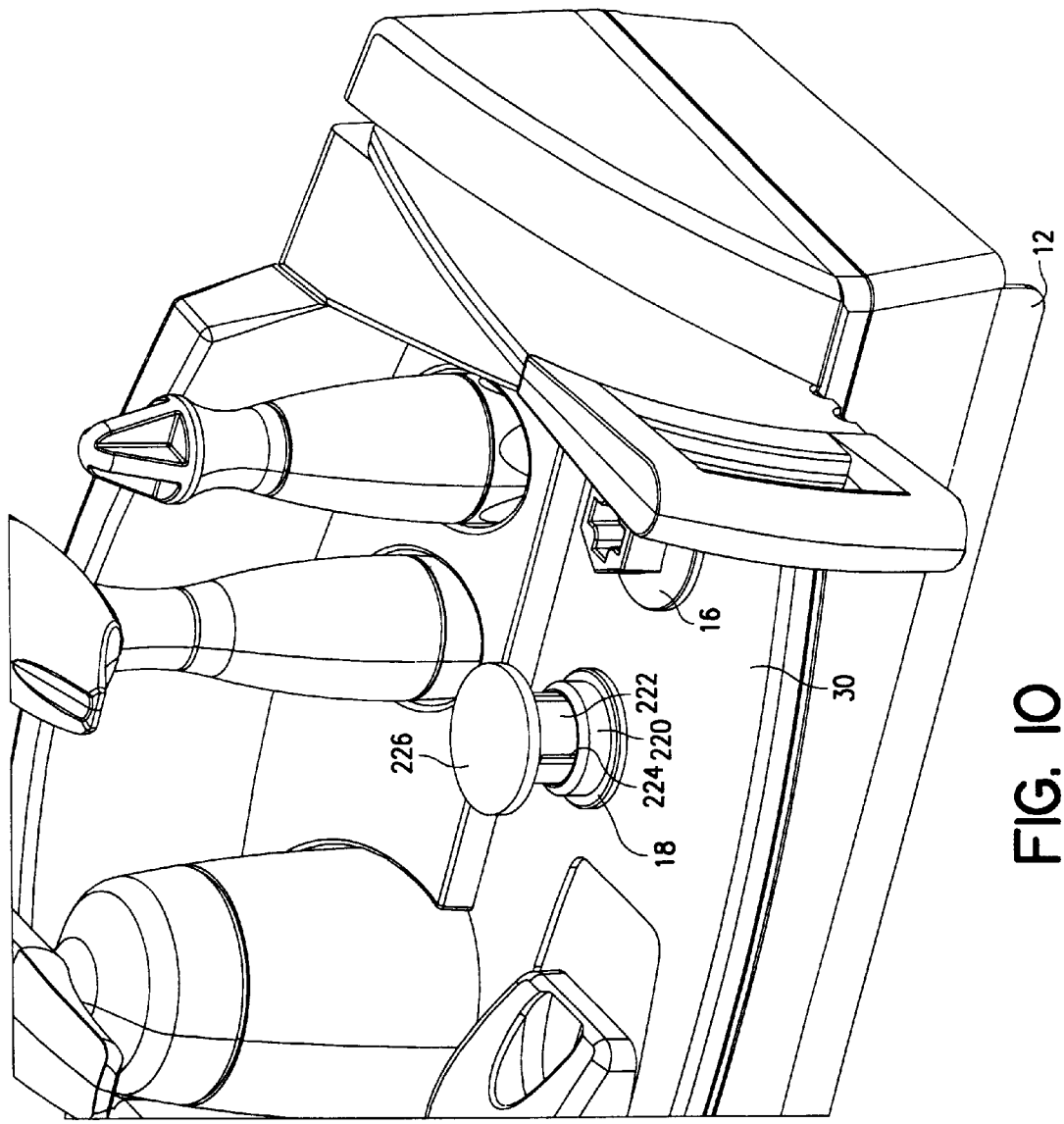
FIG. 10 illustrates a perspective view of the nail as shown in FIGS. 2 and 3 of the preferred embodiment.

FIG. 10 illustrates a perspective view of the nail 18. The nail 18 preferably comprises a head portion 226, a vertical connector 222, a guide 220, and a channel 224. Preferably, the head portion 226 is configured for being contacted by the hammer 24. However, it would be obvious to utilize another device equivalent to the hammer 24 or simply the user's hands to press down the nail 18. Further, the head portion 226 also preferably couples to a first end of the vertical connector 222. Preferably, a second end of the vertical connector 222 preferably resides in close proximity to the depressing mechanism 36. The vertical connector 222 preferably incorporates the channel 224 along the length of the vertical connector 222. Preferably, the guide 220 is coupled to the base 12 and has a notch wherein the guide 220 is configured to receive and stabilize the vertical connector 222. Further, when the guide 220 engages the vertical connector 222, the notch preferably engages the channel 224 and is configured such that the notch slides within the channel 224. Thus, the vertical connector 222 preferably moves vertically within the guide 220 relative to the base 12, and the notch is preferably engaged within the channel 224 such that the vertical connector 222 preferably has a limited range of vertical movement.

In use, when the head portion 226 of the nail 18 is not depressed by an outside force, the depressing mechanism 36 urges the nail 18 to attain an upright position. When the nail 18 is in this upright position, the notch in engagement within the channel 224 preferably limits the upward travel of the nail 18, and at the same time, the depressing mechanism 36 is preferably not depressing the particular key of the underlying keyboard 6 related to the nail 18. Conversely, when the head portion 226 of the nail 18 is depressed downward by an outside force, the depressing mechanism 36 preferably depresses the particular key of the underlying keyboard 6 related to the nail 18. Preferably, the notch engaged within the channel 224 limits the downward travel of the nail 18.

The processor 4 preferably generates a corresponding, related sound and image of the nail 18 in response to whether the particular key of the underlying keyboard 6 related to the nail 18 is either depressed or upright. This corresponding, related image of the nail 18 is preferably shown on the display 2. Further, the corresponding sound is generated by the processor 4.

Figure 11:
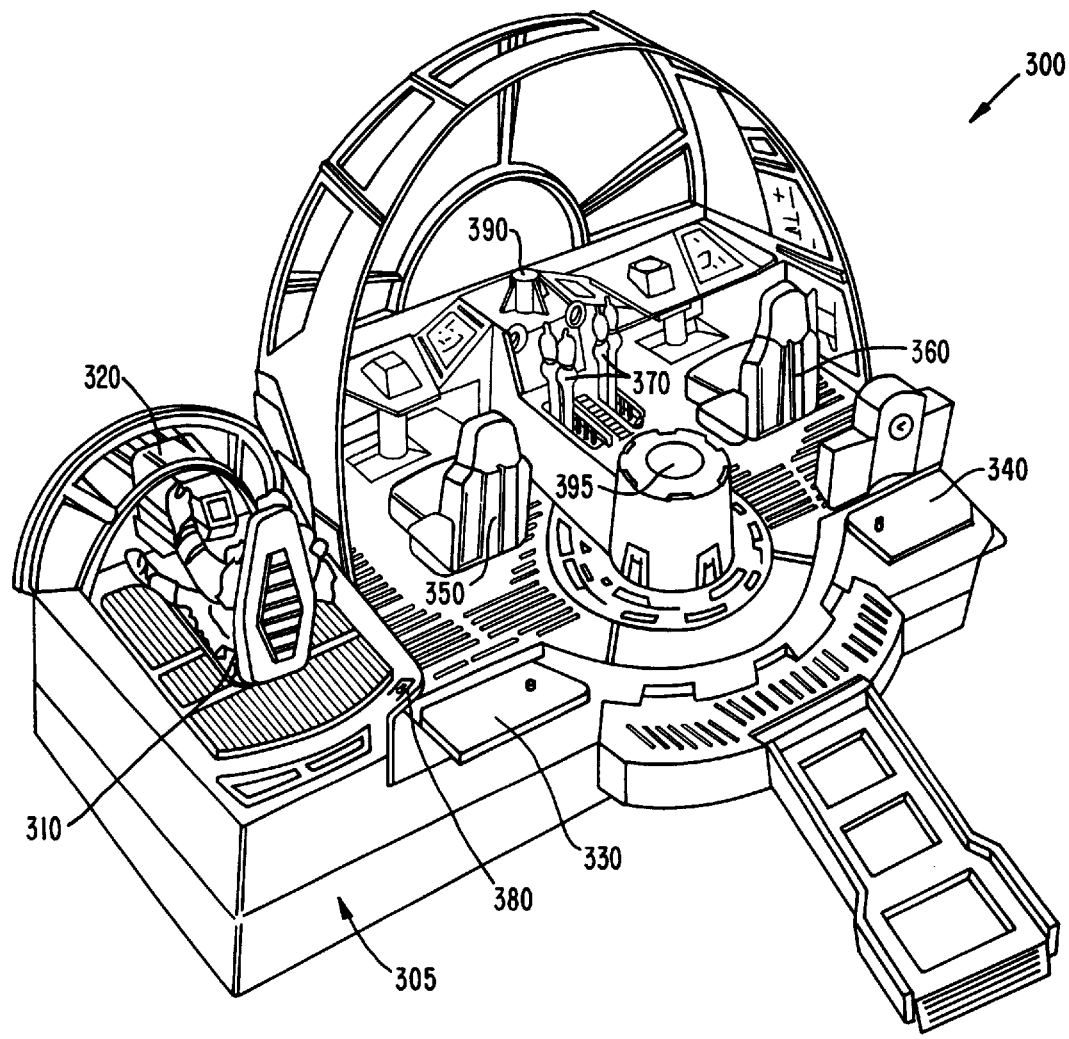
FIG. 11 illustrates a perspective view of the first alternate embodiment of the present invention.

FIG. 11 illustrates a Star Wars™ playset device 300 which comprises the first alternate embodiment of the present invention. The Star Wars™ playset device 300 is preferably coupled on top of the underlying keyboard 6. When a user activates specific three dimensional representational objects of the Star Wars™ playset device 300, a particular corresponding key of the underlying keyboard 6 is preferably depressed. The Star Wars™ playset device 300 preferably includes a base 305 which is coupled to the three dimensional representational objects. The three dimensional representational objects of the Star Wars™ playset device 300 include a stationary platform 380, a toy gun 320, a first seat 310, a second seat 350, a third seat 360, a fire button 390, a pair of throttle levers 370, a navigational button 395, a first moveable platform 330, and a second moveable platform 340.

Figure 12:
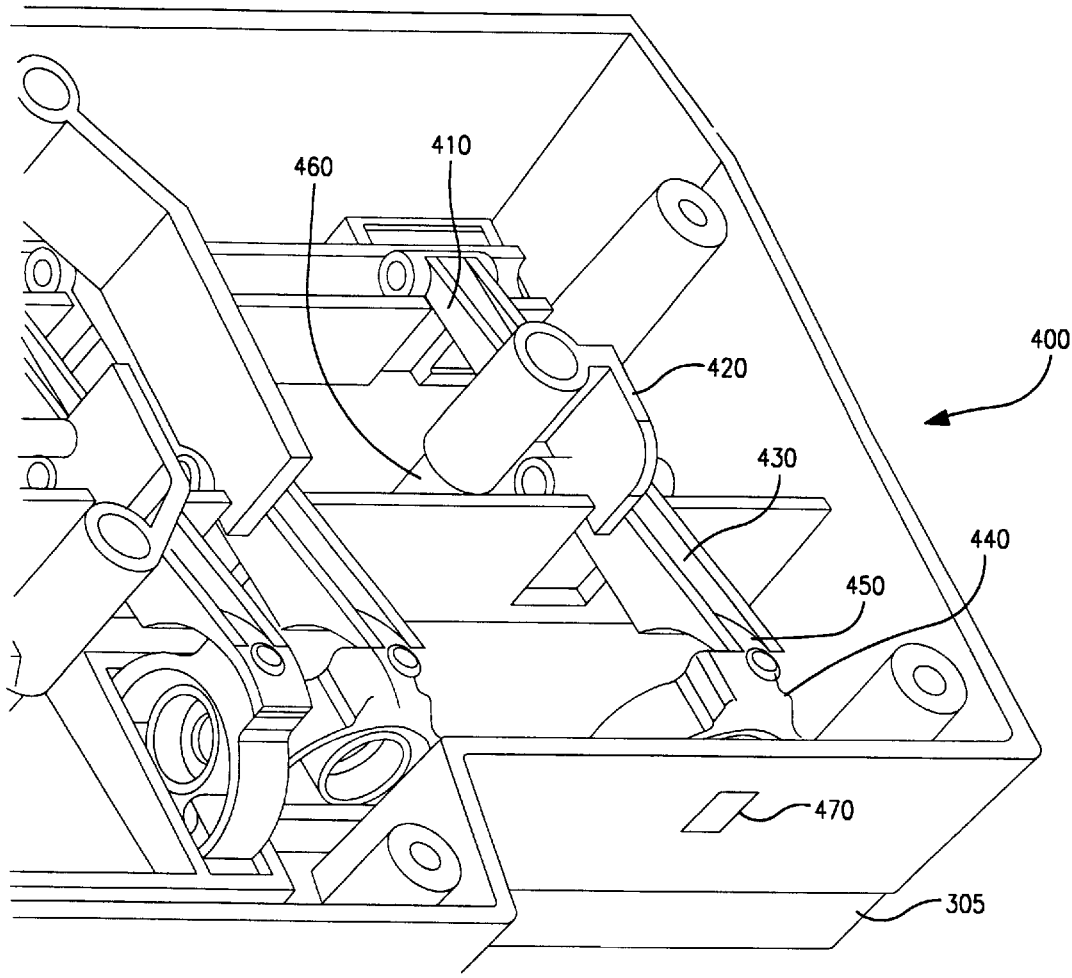
FIG. 12 illustrates an exemplary depressing mechanism for the alternate embodiment

FIG. 12 illustrates an exemplary depressing mechanism 400 for use in the Star Wars™ playset device 300. This depressing mechanism 400 is preferably configured in to depress a particular key of the underlying keyboard 6 in response to the three dimensional representational objects such as the seat (310, 350, 360), the first moveable platform 330, the second moveable platform 340, the fire button 390, and the pair of throttle levers 370. The depressing mechanism 400 preferably comprises a spring 440, a lever 430, a connector 420, a post 460, and an actuator 470.

When a particular three dimensional object activates the depressing mechanism 400, the object preferably depresses the connector 420. For the depressing mechanism 400 to function properly, a first end 410 of the lever 430 is preferably hingedly coupled to the base 305. Further, the spring 440 and the actuator 470 are preferably coupled to a second end 450 of the lever 430. Between the first end 410 and the second end 450 of the lever 430, the post 460 is preferably securely coupled to the base 305. Further, the connector 420 is preferably slideably coupled to the post 460 and preferably engages the post 460 such that the post 460 guides the connector 420 along the length of the post 460. Preferably, the connector 420 is slidably coupled to the lever 430.

In use, the three dimensional object preferably activates the depressing mechanism 400 by pressing downward on the connector 420. In turn, the connector 420 preferably applies a downward force on the lever 430. As the lever 430 receives this downward force, the second end 450 of the lever 430 rotates towards the base 305 and around the hingedly coupled first end 410 of the lever 430. As the second end 450 of the lever 430 rotates toward the base 305, the connector 420 preferably slides vertically downward toward the base 305 while guided by the post 460 and additionally preferably slides along the length of the lever 430. Further, the spring 446 preferably compresses when the second end 450 of the lever 430 rotates towards the base 305. Preferably, as the spring 440 compresses, the actuator 470 moves towards and eventually depresses a particular key of the underlying keyboard 6.

Figure 13:
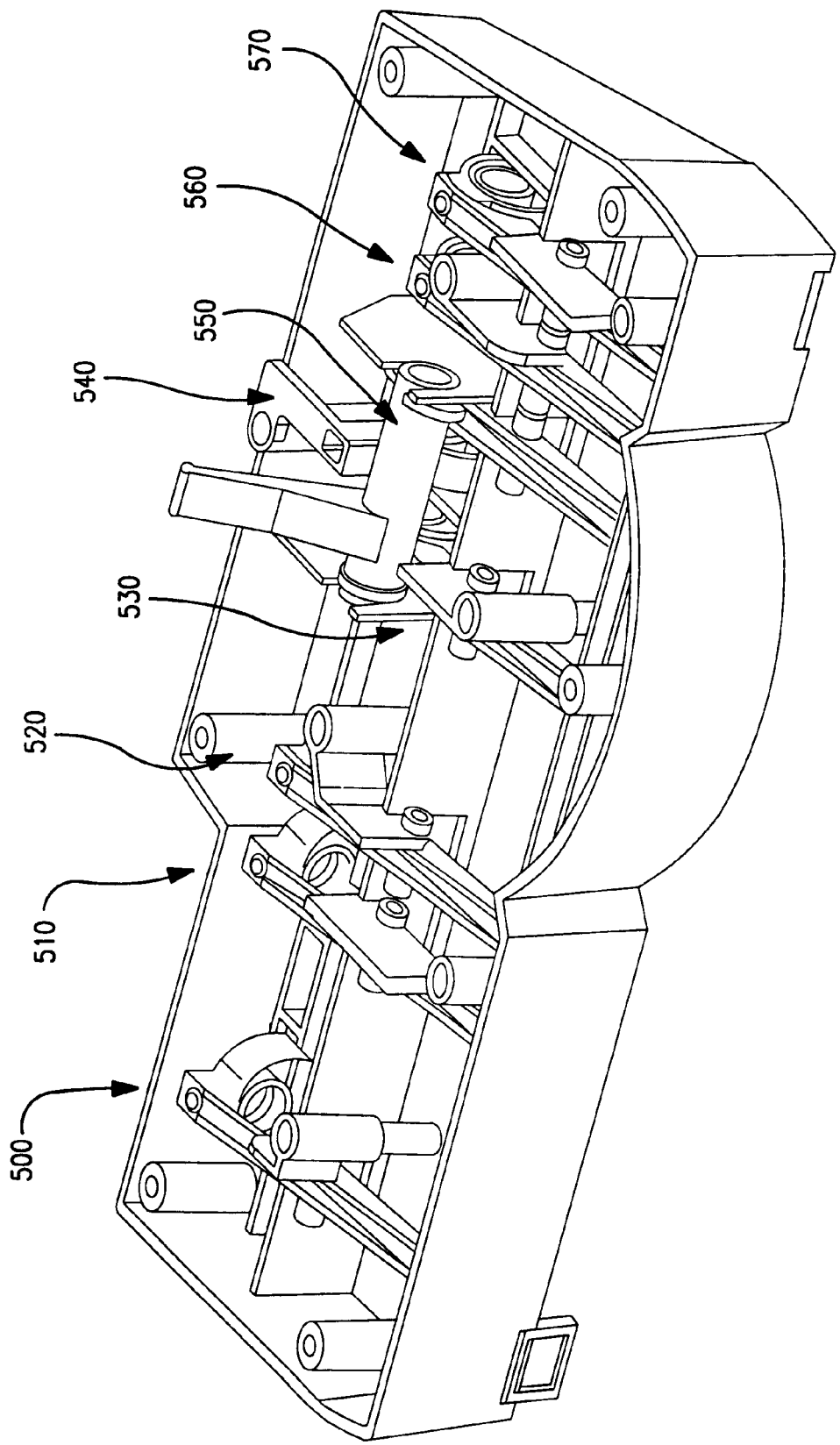
FIG. 13 illustrates a cutaway view of the base of the alternate embodiment of FIG. 11.

FIG. 13 illustrate a cutaway view of the base 305 of the Star Wars™ playset device 300 such that internal components of the base 305 are revealed. Preferably, each representational object (ie. stationary platform 380, toy gun 320, first seat 310, second seat 350, third seat 360, fire button 390, pair of throttle levers 370, first moveable platform 330, and second moveable platform 340) has an underlying corresponding depressing mechanism and is also coupled to this corresponding depressing mechanism. For example, a depressing mechanism 500 corresponds to the first seat 310, a depressing mechanism 510 corresponds to the first moveable platform 330, a depressing mechanism 520 corresponds to the second seat 350, a depressing mechanism 530 corresponds to the navigational button 395, a depressing mechanism 540 corresponds to the fire button 390, a depressing mechanism 550 corresponds to the pair of throttle levers 370, a depressing mechanism 560 corresponds to the third seat 360, and a depressing mechanism 570 corresponds to the second moveable platform 340. Preferably, each of these underlying depressing mechanisms is located below their respective three dimensional representational objects and above the underlying keyboard 6. In other words, each depressing mechanism preferably acts as a connector between each representational object and the corresponding key of the underlying keyboard 6. Each spring of the depressing mechanism preferably prevents the corresponding key of the underlying keyboard 6 from being depressed when the representational object is not manipulated appropriately. Conversely, when the representational object is appropriately manipulated, each corresponding depressing mechanism preferably depresses the corresponding, underlying key.

The first seat 310, second seat 350, and third seat 360 are preferably configured to hold a Star Wars™ action figure and are capable of depressing a particular key of the underlying keyboard 6 by being pushed downward toward the base 305. The first seat 310 is preferably occupied by a Luke Skywalker Star Wars™ action figure. The second seat 350 is preferably occupied by a Han Solo Star Wars™ action figure. The third seat 360 is preferably occupied by a Chewbacca Star Wars™ action figure. The description above showing seating preferences of Luke Skywalker, Han Solo, and Chewbacca action figures are only for exemplary purposes. Use of any action figure in either the first seat 310, second seat 350, or third seat 360, would be within the scope and spirit of the Star Wars™ playset device 300.

In addition, the first, second, and third seats (310, 350, and 360) are pushed preferably downward toward the base 305 directly by the user or by the user placing an action figure in the corresponding seat. When a particular seat is pushed downward or depressed toward the base 305, a corresponding depressing mechanism housed within the base 305 preferably depresses a corresponding key of the underlying keyboard. When there is no force pushing a particular seat downward, the seat preferably remains in an upright position. When in this upright position, the particular seat is preferably unactivated and the depressing mechanism within the base 305 does not depress the corresponding key of the underlying keyboard 6.

Further, the first seat 310 is preferably configured to rotate. Preferably, the first seat 310 is coupled to the toy gun 320 such that the toy gun 320 moves in response to the first seat 310.

The pair of throttle levers 370 are preferably configured such that the user is capable of moving each throttle lever. In response to the movement of each throttle lever by the user, the depressing mechanism 550 within the base 305, preferably depresses the corresponding key of the underlying keyboard.

The first moveable platform 330 and the second moveable platform 340 are capable of being moved by the user downward toward the base 305. The first movable platform 330 preferably provides a C3PO station for a C3PO Star Wars™ action figure. Similarly, the second movable platform 340 preferably provides an R2D2 station for an R2D2 Star Wars™ action figure. Preferably, by being moved downward, the first moveable platform 330 depresses the depressing mechanism 510 within the base 305. Similarly, by being moved downward, the second moveable platform 340 depresses the depressing mechanism 570 within the base 305. By depressing the depressing mechanism 510, a particular key of the underlying keyboard 6 related to the first moveable platform 330 is preferably depressed. Similarly, by depressing the depressing mechanism 570, a particular key of the underlying keyboard 6 related to the second moveable platform 340 is preferably depressed.

The fire button 390 is coupled to the Star Wars™ playset device 300. Further, the fire button 390 is preferably capable Of being depressed by the user. Once the fire button 390 is depressed by the user, the depressing mechanism 540 within the base 305 is preferably activated such that the depressing mechanism 540 depresses a particular key on the underlying keyboard 6 related to the fire button 390.

Figure 14:
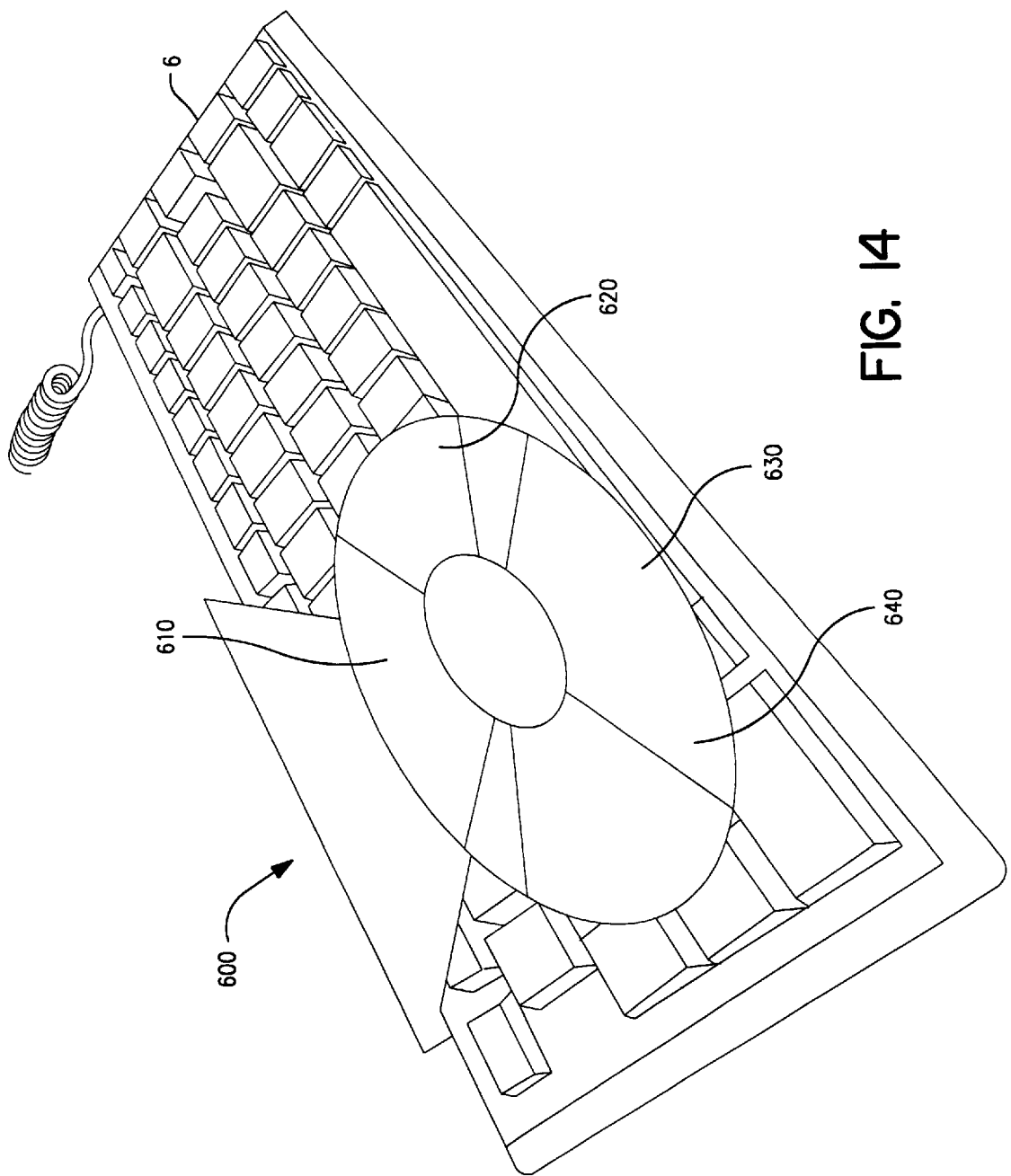
FIG. 14 illustrates a perspective view of the second alternate embodiment of the present invention.

FIG. 14 illustrates a game pad 600 which is the second alternate embodiment of the present invention. Similar to the toy workshop 10 (FIG. 2) and the Star Wars™ playset device 300 (FIG. 11), the game pad 600 interacts with the underlying keyboard 6. The game pad 600 preferably has four button which include a first button 610, a second button 620, a third button 630, and a fourth button 640. These four buttons (610, 620, 630, and 640) are configured to be large and easily depressed by the user. Once the user depresses either the first, second, third, or fourth buttons (610, 620, 630, and 640), a corresponding key of the underlying keyboard 6 is preferably depressed. The number of buttons on the game pad 600 is provided for illustrative purposes and should not limit the scope of the present invention.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the embodiments disclosed above are only exemplary of the preferred embodiment and the alternate embodiments of the invention and is in no way a limitation.

What is claimed is:

1. An interface device for placement over an underlying keyboard which has a plurality of keys, including number keys and letter keys, each key being configured to move along a generally vertical axis, the interface device comprising:
   a housing configured to be removably secured to the underlying keyboard and sized so that the housing covers letter keys of the underlying keyboard when secured to the underlying keyboard;
   three-dimensional representational objects mounted on the housing and configured to be manipulated by a user, each representational object providing a three-dimensional representation of an object selected from the group consisting of construction tools, controls of a vehicle, and elements of a play environment; and
   mechanisms coupled to the representational objects and configured to press keys on the underlying keyboard in response to manipulation of the representational objects by the user,
   wherein, when the interface device is placed over the keyboard, at least one representational object is positioned generally over a key on the keyboard that is pressed by a mechanism coupled to the representational object, such that the axis of the key passes through at least a portion of the representational object during manipulation of the representational object, and the representational object is configured to move in a direction other than along the axis of the key, and
   one of the representational objects comprises a toy drill, the toy drill further comprising:
      a handle having a first terminal capable of being manipulated by the user like a real drill;

a cam portion attached to a second terminal of the handle wherein the cam portion moves when the handle moves; and a rod having a first end in close proximity to the cam portion and a second end in close proximity to one of the mechanisms, wherein the rod engages the mechanism in response to manipulation of the handle by the user.

2. The interface device according to claim 1, wherein one of the representational objects comprises a toy saw, the toy saw being movable by the user in a sawing motion and including an incline portion coupled to engage one of the mechanisms in response to movement of the toy saw by the user.

3. The interface device according to claim 1, wherein one of the representational objects comprises a toy saw, the toy saw being movable by the user in a sawing motion and including a semi-circle portion coupled to engage one of the mechanisms in response to movement of the toy saw by the user.

4. The interface device according to claim 1, wherein one of the representational objects comprises a toy screw, the toy screw being rotatable by the user and including a cam coupled to engage one of the mechanisms in response to rotation of the toy screw by the user.

5. The interface device according to claim 4 further comprising a toy screwdriver for engaging and turning the toy screw.

6. The interface device according to claim 1, wherein one of the representational objects comprises a toy nail, the toy nail being movable by the user in a nailing motion and including a connector coupled to engage one of the mechanisms in response to movement of the toy nail by the user.

7. The interface device according to claim 6 further comprising a toy hammer for contacting and depressing the toy nail.

8. The interface device according to claim 1, wherein one of the representational objects comprises a toy sander, the toy sander being movable by the user in a sanding motion and including an incline portion coupled to engage one of the mechanisms in response to movement of the toy sander by the user.

9. The interface device according to claim 1, wherein one of the representational objects comprises a toy sander, the toy sander being movable by the user in a sanding motion and including a semi-circle portion coupled to engage one of the mechanisms in response to movement of the toy sander by the user.

10. The interface device according to claim 1, wherein one of the representational objects comprises a toy sprayer, the toy sprayer being manipulable by the user in a spraying motion and including a connecting rod coupled to engage one of the mechanisms in response to manipulation of the toy sprayer by the user.

11. The interface device according to claim 1, wherein at least one of the mechanisms further comprises:

an actuator coupled to one of the representational objects for pressing a corresponding key in response to manipulation of the representational object, and a spring coupled to bias the actuator away from pressing the corresponding key.

12. The interface device according to claim 11, wherein the spring is made of silicon rubber.

13. The interface device according to claim 11, wherein the spring is a bellows type spring.

14. The interface device according to claim 11, wherein the actuator is made of silicon rubber.

15. The interface device according to claim 11, further comprising a cushion coupled to the actuator.

16. The interface device according to claim 1, wherein at least one of the mechanisms further comprises:

a. a lever having a first end and a second end, wherein the first end is hingedly coupled to the device;

b. an actuator coupled to the second end of the lever for selectively depressing a corresponding key on the underlying keyboard;

c. a spring coupled to the second end of the lever for biasing the actuator away from depressing the corresponding key; and d. a vertical pusher coupled to a corresponding one of the representational objects and slidably coupled to the lever between the first end and the second end.

17. The interface device according to claim 16, wherein the lever is configured to act as a reducer.

18. The interface device according to claim 16, wherein the lever is configured to act as a multiplier.

19. The interface device according to claim 16, wherein the spring is made of silicon rubber.

20. The interface device according to claim 16, wherein the spring is made of metal.

21. The interface device according to claim 16, wherein the spring is made of plastic.

22. The interface device according to claim 16, wherein the spring is a coil spring.

23. The interface device according to claim 16, wherein the spring is a bellows spring.

24. The interface device according to claim 16, wherein the actuator is made of silicon rubber.

25. The interface device according to claim 16, further comprising a cushion coupled to the actuator.

26. The interface device according to claim 1, wherein the representational objects represent a set of construction tools.

27. The interface device according to claim 1, further comprising the underlying keyboard and a computer to which the underlying keyboard is attached, the computer including a processor and a display, wherein:

the interface device is attached to the underlying keyboard such that manipulation of the representational objects cause the mechanisms to press particular keys of the keyboard; and the processor is operable to cause the display to display images corresponding to manipulation of the objects represented by the representational objects when the particular keys are pressed.

28. An interface device for placement over an underlying keyboard which has a plurality of keys, including number keys and letter keys, each key being configured to move along a generally vertical axis, the interface device comprising:

a housing configured to be removably secured to the underlying keyboard;

three-dimensional representational objects mounted on the housing and configured to be manipulated by a user, each representational object providing a three-dimensional representation of a control mechanism of a vehicle; and mechanisms coupled to the representational objects and configured to press keys on the underlying keyboard in response to manipulation of the representational objects by the user, wherein:

when the interface device is placed over the keyboard, at least one representational object is positioned generally over a key on the keyboard that is pressed by a mechanism coupled to the representational object, such that the axis of the key passes through at least a portion of the representational object during manipulation of the representational object, and the representational object is configured to move in a direction other than along the axis of the key, and one of the representational objects comprises a toy drill, the toy drill further comprising:
    a handle having a first terminal capable of being manipulated by the user like a real drill;
    a cam portion attached to a second terminal of the handle wherein the cam portion moves when the handle moves; and
    a rod having a first end in close proximity to the cam portion and a second end in close proximity to one of the mechanisms, wherein the rod engages the mechanism in response to manipulation of the handle by the user.

29. The interface device according to claim 28, wherein at least one of the mechanisms further comprises:
    an actuator coupled to one of the representational objects for pressing a corresponding key in response to manipulation of the representational object, and
    a spring coupled to bias the actuator away from pressing the corresponding key.

30. The interface device according to claim 29, further comprising a cushion coupled to the actuator.

31. The interface device according to claim 28, wherein at least one of the mechanisms further comprises:
    a lever having a first end and a second end, wherein the first end is hingedly coupled to the device;
    an actuator coupled to the second end of the lever for selectively depressing a corresponding key on the underlying keyboard;
    a spring coupled to the second end of the lever for biasing the actuator away from depressing the corresponding key; and
    a vertical pusher coupled to a corresponding one of the representational objects and slidably coupled to the lever between the first end and the second end.

32. The interface device according to claim 31, further comprising a cushion coupled to the actuator.

33. An interface device for placement over an underlying keyboard which has a plurality of keys, including number keys and letter keys, each key being configured to move along a generally vertical axis, the interface device comprising:
    a housing configured to be removably secured to the underlying keyboard and sized so that the housing covers letter keys of the underlying keyboard when secured to the underlying keyboard; and
    three-dimensional representational objects mounted on the housing and configured to cause predetermined keys of the keyboard to be pressed in response to predefined movements of the representational objects, each representational object providing a three-dimensional representation of an object selected from the group consisting of construction tools, controls of a vehicle, and elements of a play environment, wherein:
    when the interface device is placed over the keyboard, at least one representational object is positioned generally over a key on the keyboard that is pressed by a mechanism coupled to the representational object, such that the axis of the key passes through at least a portion of the representational object during manipulation of the representational object, and the representational object is configured to move in a direction other than along the axis of the key, and
    one of the representational objects comprises a toy drill, the toy drill further comprising:
        a handle having a first terminal capable of being manipulated by the user like a real drill;
        a cam portion attached to a second terminal of the handle wherein the cam portion moves when the handle moves; and
        a rod having a first end in close proximity to the cam portion and a second end in close proximity to one of the mechanisms, wherein the rod engages the mechanism in response to manipulation of the handle by the user.

\* \* \* \* \*